(12) United States Patent
Gueye

(10) Patent No.: US 12,169,590 B2
(45) Date of Patent: Dec. 17, 2024

(54) METHODS, SYSTEMS, APPARATUSES, AND DEVICES FOR FACILITATING MODIFYING ENVIRONMENTS BASED ON USER PREFERENCES

(71) Applicant: Mamadou Mande Gueye, Baltimore, MD (US)

(72) Inventor: Mamadou Mande Gueye, Baltimore, MD (US)

( * ) Notice: Subject to any disclaimer, the term of this patent is extended or adjusted under 35 U.S.C. 154(b) by 0 days.

(21) Appl. No.: 17/569,427

(22) Filed: Jan. 5, 2022

(65) Prior Publication Data

US 2022/0129064 A1    Apr. 28, 2022

Related U.S. Application Data

(63) Continuation-in-part of application No. 15/938,945, filed on Mar. 28, 2018, now abandoned, which is a continuation-in-part of application No. 15/713,357, filed on Sep. 22, 2017, now Pat. No. 9,953,091.

(60) Provisional application No. 62/402,401, filed on Sep. 30, 2016.

(51) Int. Cl.
*G06F 3/00* (2006.01)
*G06F 3/01* (2006.01)

(52) U.S. Cl.
CPC .................... *G06F 3/011* (2013.01)

(58) Field of Classification Search
CPC ..... G06F 3/011; A63F 13/61; G01C 21/3484; G01C 21/3492; G01C 21/3617; G01C 21/343; G06Q 50/01
See application file for complete search history.

(56) References Cited

U.S. PATENT DOCUMENTS

| 11,601,618 | B1* | 3/2023 | Slotznick | ............... H04N 7/147 |
| 2006/0155460 | A1 | 7/2006 | Raney | |
| 2007/0073562 | A1 | 3/2007 | Brice | |
| 2007/0273558 | A1 | 11/2007 | Smith | |
| 2012/0284324 | A1 | 11/2012 | Jarville | |

(Continued)

OTHER PUBLICATIONS

VisualDNA, "Using Visual Questionnaires to Measure Personality Traits", VisualDNA, 10,20 Jun. 23, 2014. Retrieved on (Jul. 5, 2019]. Retrieve from <URL: https://www.visualdna.com/wp-content/uploads/2014/09/ocean_validation_short.pdf> entire document.

*Primary Examiner* — Tyler J Torgrimson

(57) ABSTRACT

A computer implemented method and a system for facilitating modifying environments based on user preferences is provided. Accordingly, the method may include receiving, using a communication device, interaction data of interactions of a user in relation to experiential environments of two or more experiential environments from user devices. Further, the computer implemented method may include analyzing, using a processing device, the interaction data. Further, the computer implemented method may include determining, using the processing device, two or more user preferences associated with the user based on the analyzing of the interaction data. Further, the computer implemented method may include provisioning, using the processing device, two or more content corresponding to the two or more experiential environments based on the two or more user preferences. Further, the computer implemented method may include storing, using a storage device, the interaction data and the two or more user preferences.

10 Claims, 9 Drawing Sheets

(56) References Cited

U.S. PATENT DOCUMENTS

| | | |
|---|---|---|
| 2012/0309314 A1 | 12/2012 | Chen |
| 2013/0054593 A1 | 2/2013 | Park |
| 2014/0095599 A1 | 4/2014 | Engle |
| 2015/0127597 A1* | 5/2015 | Pinckney ............... G06N 20/00 706/52 |
| 2015/0127638 A1* | 5/2015 | Parks ................. G06F 16/9537 707/723 |
| 2017/0103425 A1 | 4/2017 | Christofi |

* cited by examiner

METHODS, SYSTEMS, APPARATUSES, AND DEVICES FOR FACILITATING MODIFYING ENVIRONMENTS BASED ON USER PREFERENCES

The current application is a continuation-in-part (CIP) application of a U.S non-provisional application Ser. No. 15/938,945 filed on Mar. 28, 2018. The U.S. non-provisional application Ser. No. 15/938,945 claims a priority to a U.S non-provisional application Ser. No. 15/713,357 filed on Sep. 22, 2017. The U.S. non-provisional application Ser. No. 15/713,357 claims a priority to a U.S. provisional application Ser. No. 62/402,401 filed on Sep. 30, 2016.

FIELD OF THE INVENTION

Generally, the present disclosure relates to the field of data processing. More specifically, the present disclosure relates to methods, systems, apparatuses, and devices for facilitating modifying environments based on user preferences.

BACKGROUND OF THE INVENTION

The year is 2021, targeted ads are the most interpersonal of your social media interactions, end Users struggle to remain engaged in the static slush of information, likes have become less rewarding; there's a dearth of dynamic, interactive, personalized content connected to analog reality. This digital stagnation needs to be rendered, lest we find ourselves looking forward to targeted ads in our timeline.

Despite advances, User connection and content have stagnated to a limited variety of digitally static options. Limited to basic feeds and messaging systems, bots mining our data, etc. There are technologically limited instances of User interaction with analog reality via AR, all the whilst keeping the end user handcuffed to their mobile device, or other hardware. Thereby stagnating the User experience, keeping people from interfacing with the system in a manner that is conducive to natural human interaction and physical control. By restricting the user's ability to maneuver around the matrix of internal operations, where the end user is attached to a hardware device, and therefore isolated, simply interacting with a social media program and not networking on an analog and digitally socially interconnected physically dynamic reality based platform.

The many inhibiting factors of current system designs and approaches are keeping people from bridging the space between their technology device and anything else—whether physical, digital, or virtual, therefore they're confined to device-oriented relationships.

Having a relationship with a hardware device is not the same as leveraging the technology to connect the end user to the real world with enhanced augmentations via technology. To better optimize the users' experience, in the real world and the digital world, in real time, a simple invention is required, building in reverse (Analog first digital second Wetware to Software to Hardware).

Existing techniques for facilitating modifying environments based on user preferences are deficient with regard to several aspects. For instance, current technologies do not modify all environments associated with the users based on users' preferences. Furthermore, current technologies do not use users' interactions with an environment to determine the users' preferences.

Therefore, there is a need for methods, systems, apparatuses, and devices for facilitating modifying environments based on user preferences that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a computer implemented method for facilitating modifying environments based on user preferences, in accordance with some embodiments. Accordingly, the computer implemented method may include a step of receiving, using a communication device, one or more interaction data of one or more interactions of a user in relation to one or more experiential environments of two or more experiential environments from one or more user devices. Further, the computer implemented method may include a step of analyzing, using a processing device, the one or more interaction data. Further, the computer implemented method may include a step of determining, using the processing device, two or more user preferences associated with the user based on the analyzing of the one or more interaction data. Further, the computer implemented method may include a step of provisioning, using the processing device, two or more content corresponding to the two or more experiential environments based on the two or more user preferences. Further, the computer implemented method may include a step of storing, using a storage device, the one or more interaction data and the two or more user preferences.

Further disclosed herein is a system for facilitating modifying environments based on user preferences, in accordance with some embodiments. Accordingly, the system may include a communication device, a processing device, and a storage device. Further, the communication device may be configured for performing a step of receiving one or more interaction data of one or more interactions of a user in relation to one or more experiential environment of two or more experiential environments from one or more user devices. Further, the processing device may be communicatively coupled with the communication device. Further, the processing device may be configured for performing a step of analyzing the one or more interaction data. Further, the processing device may be configured for performing a step of determining two or more user preferences associated with the user based on the analyzing of the one or more interaction data. Further, the processing device may be configured for performing a step of provisioning two or more content corresponding to the two or more experiential environments based on the two or more user preferences. Further, the storage device may be communicatively coupled with the processing device. Further, the storage device may be configured for performing a step of storing the one or more interaction data and the two or more user preferences.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
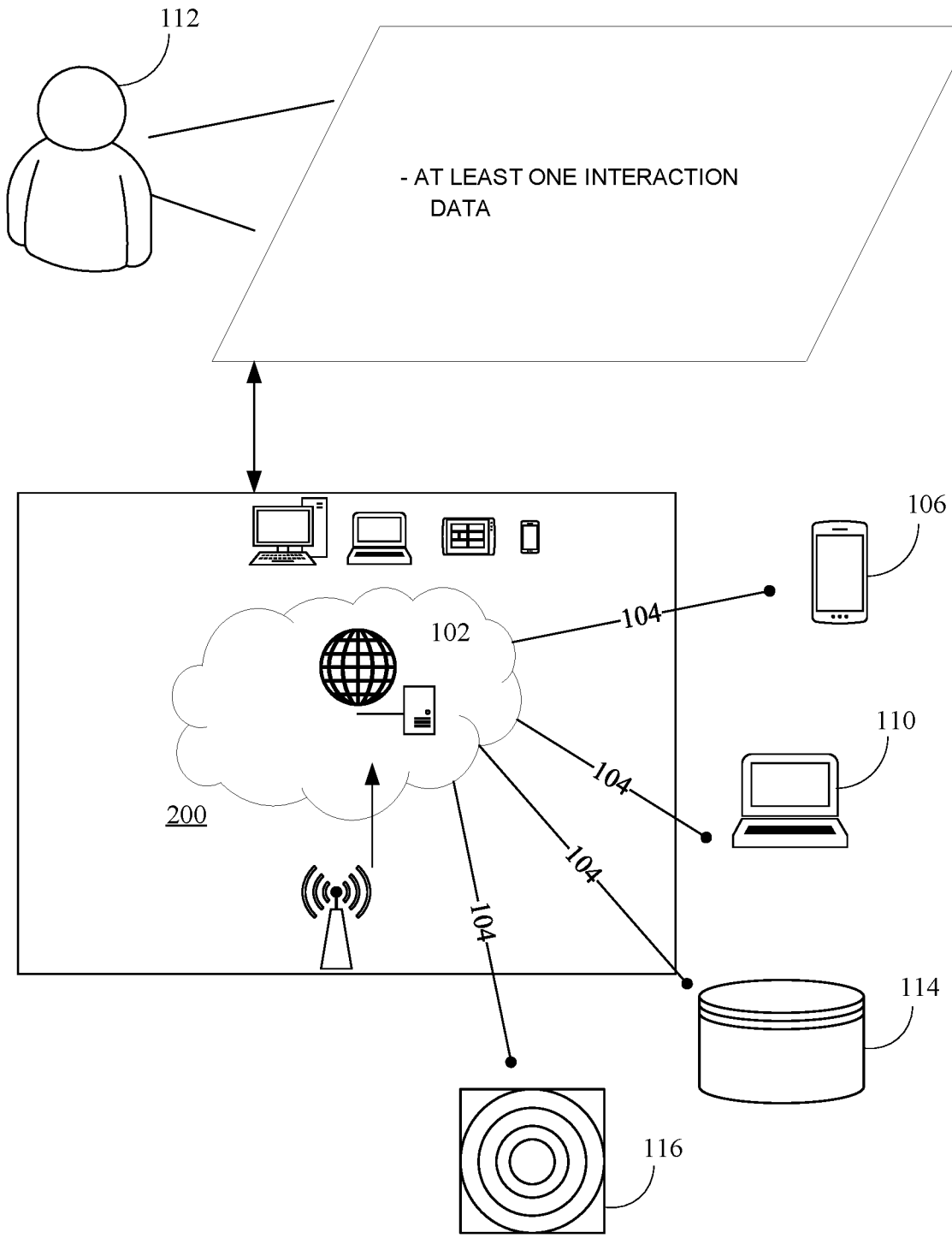
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of facilitating modifying environments based on user preferences, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g., a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g., username, password, passphrase, PIN, secret question, secret answer etc.) and/or possession of a machine readable secret data (e.g., encryption key, decryption key, bar codes, etc.) and/or or possession of one or more embodied characteristics unique to the user (e.g., biometric variables such as, but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g., the server computer, a client device etc.) corresponding to the performance of the one or more steps, environmental variables (e.g., temperature, humidity, pressure, wind speed, lighting, sound, etc.) associated with a device corresponding to the performance of the one or more steps, physical state and/or physiological state and/or psychological state of the user, physical state (e.g., motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g., a real-time clock), a location sensor (e.g., a GPS receiver, a GLONASS receiver, an indoor location sensor etc.), a biometric sensor (e.g., a fingerprint sensor), an environmental variable sensor (e.g., temperature sensor, humidity sensor, pressure sensor, etc.) and a device state sensor (e.g., a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

FIG. 1 is an illustration of an online platform 100 consistent with various embodiments of the present disclosure. By way of non-limiting example, the online platform 100 to enable facilitating modifying environments based on user preferences may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 200.

Figure 2:
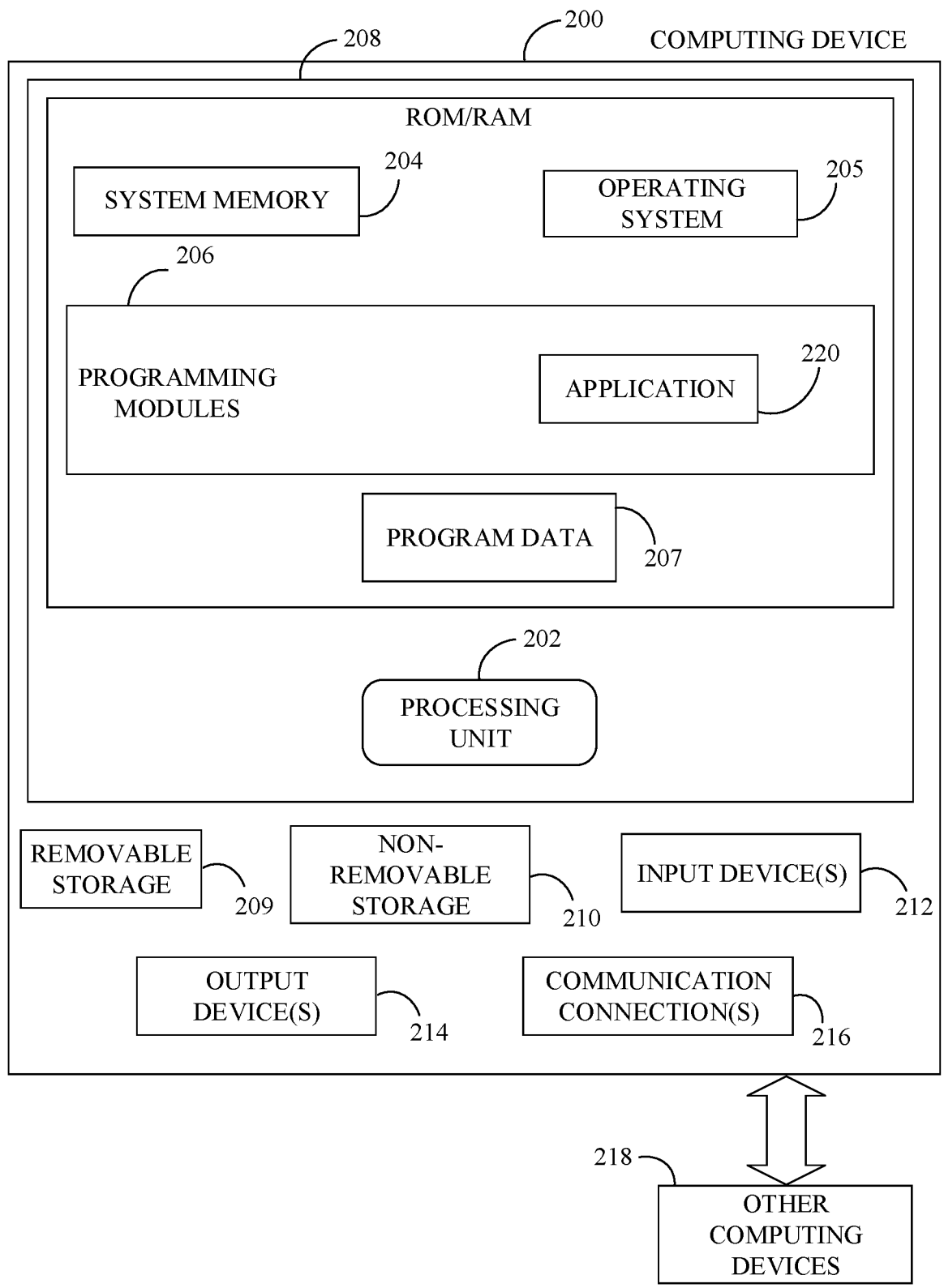
FIG. 2 is a block diagram of a computing device for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g., random-access memory (RAM)), non-volatile (e.g., read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3:
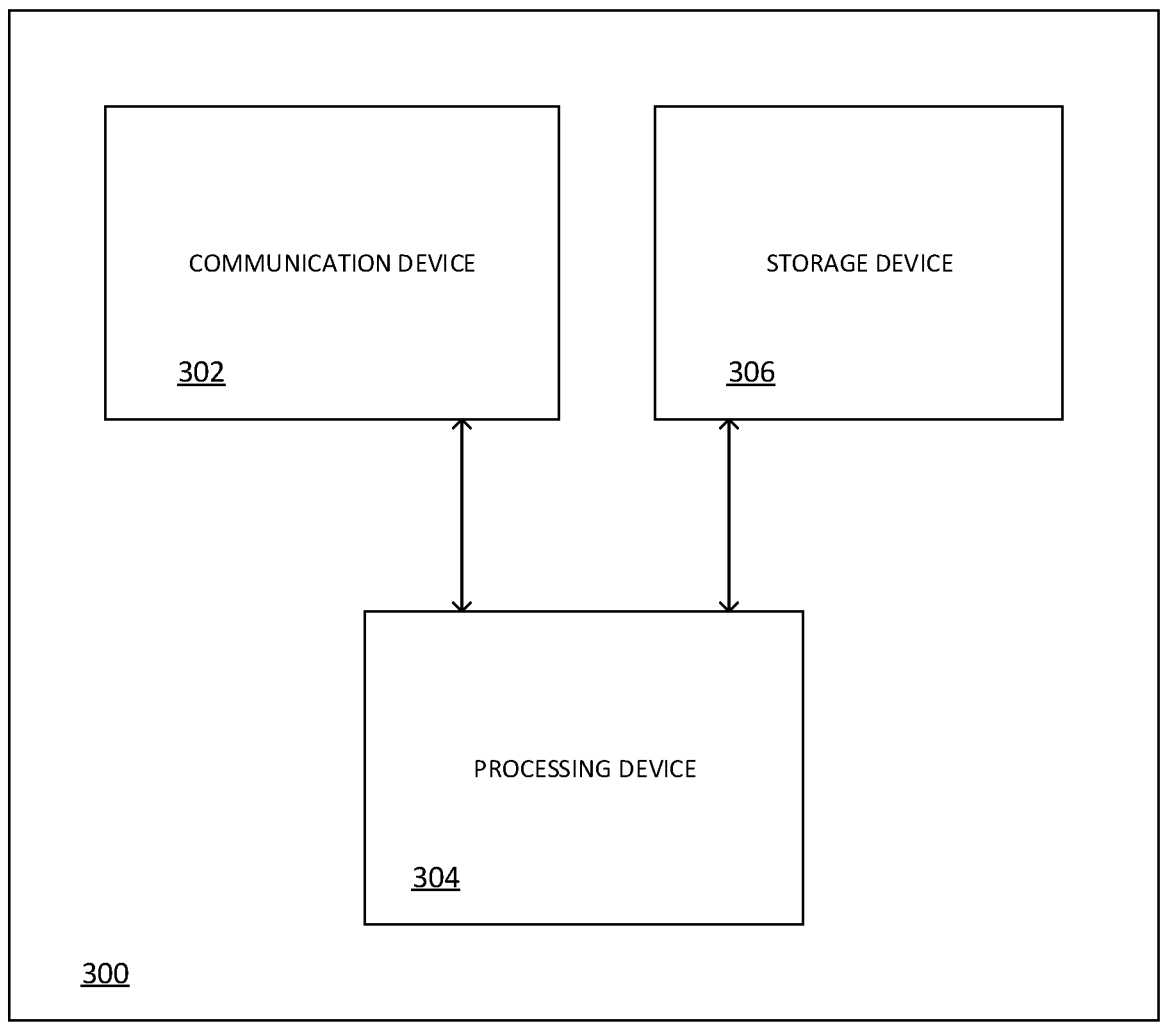
FIG. 3 is a block diagram of a system for facilitating modifying experiential environments based on user preferences, in accordance with some embodiments.

FIG. 3 is a block diagram of a system 300 for facilitating modifying experiential environments based on user preferences, in accordance with some embodiments. Accordingly, the system 300 may include a communication device 302, a processing device 304, and a storage device 306.

Further, the communication device 302 may be configured for performing a step of receiving one or more interaction data of one or more interactions of a user in relation to one or more experiential environments of two or more experiential environments from one or more user devices.

Further, the processing device 304 may be communicatively coupled with the communication device 302. Further, the processing device 304 may be configured for performing a step of analyzing the one or more interaction data. Further, the processing device 304 may be configured for performing a step of determining two or more user preferences associated with the user based on the analyzing of the one or more interaction data. Further, the processing device 304 may be configured for performing a step of provisioning two or more content corresponding to the two or more experiential environments based on the two or more user preferences.

Further, the storage device 306 may be communicatively coupled with the processing device 304. Further, the storage device 306 may be configured for performing a step of storing the one or more interaction data and the two or more user preferences.

In some embodiments, the one or more user devices may include one or more interaction detecting sensors. Further, the one or more interaction detecting sensors may be configured for generating the one or more interaction data based on capturing the one or more interactions of the user.

In some embodiments, the analyzing of the one or more interaction data may include analyzing the one or more interaction data using one or more machine learning models. Further, the determining of the two or more user preferences may include inferring the two or more user preferences based on the analyzing of the one or more interaction data using the one or more machine learning models.

In some embodiments, the one or more interaction data may include one or more historical interaction data. Further, the one or more historical interaction data may include one or more historical interactions of the user in relation to the one or more experiential environments. Further, the analyzing of the one or more interaction data may include analyzing the one or more historical interaction data. Further, the determining of the two or more user preferences may be further based on the analyzing of the one or more historical interaction data.

In some embodiments, the one or more interaction data may include two or more direct indications of the two or more user preferences of the user. Further, the analyzing of the one or more interaction data may include identifying the two or more direct indications of the two or more user preferences. Further, the determining of the two or more user preferences may be further based on the identifying.

In some embodiments, the processing device 304 may be configured for performing a step of determining one or more imagery adjustments for a framework of perception of the two or more experiential environments based on the determining of the two or more user preferences. Further, the provisioning of the two or more content corresponding to the two or more experiential environments may include modifying the two or more content corresponding to the two or more experiential environments based on the one or more imagery adjustments.

In some embodiments, the processing device 304 may be configured for performing a step of adjusting two or more layers in the two or more experiential environments based on the two or more user preferences. Further, the provisioning of the two or more content corresponding to the two or more experiential environments may be further based on the adjusting. Further, the two or more layers may include one or more of two or more data layers, two or more imagery layers, and two or more perception layers.

In some embodiments, the communication device 302 may be configured for performing a step of receiving one or more environmental sensor data from one or more environmental sensors. Further, the one or more environmental sensors may be configured for generating the one or more environmental sensor data based on capturing one or more environment characteristics of an environment associated with the user. Further, the processing device 304 may be configured for performing a step of analyzing the one or more environmental sensor data. Further, the determining of the two or more user preferences may be further based on the analyzing of the one or more environmental sensor data.

In some embodiments, the communication device 302 may be configured for performing a step of receiving one or more activity data of one or more activities of the user from one or more activity detector devices. Further, the one or more activity detector devices may be configured for generating the one or more activity data based on detecting an activity of the user in relation to the one or more experiential environments. Further, the processing device 304 may be configured for performing a step of analyzing the one or more activity data. Further, the determining of the two or more user preferences may be further based on the analyzing of the one or more activity data.

In some embodiments, the communication device 302 may be configured for performing a step of receiving one or more conditions associated with the one or more interactions from the one or more user devices. Further, the processing device 304 may be configured for performing a step of analyzing the one or more conditions. Further, the determining of the two or more user preferences may be further based on the analyzing of the one or more conditions.

Figure 4:
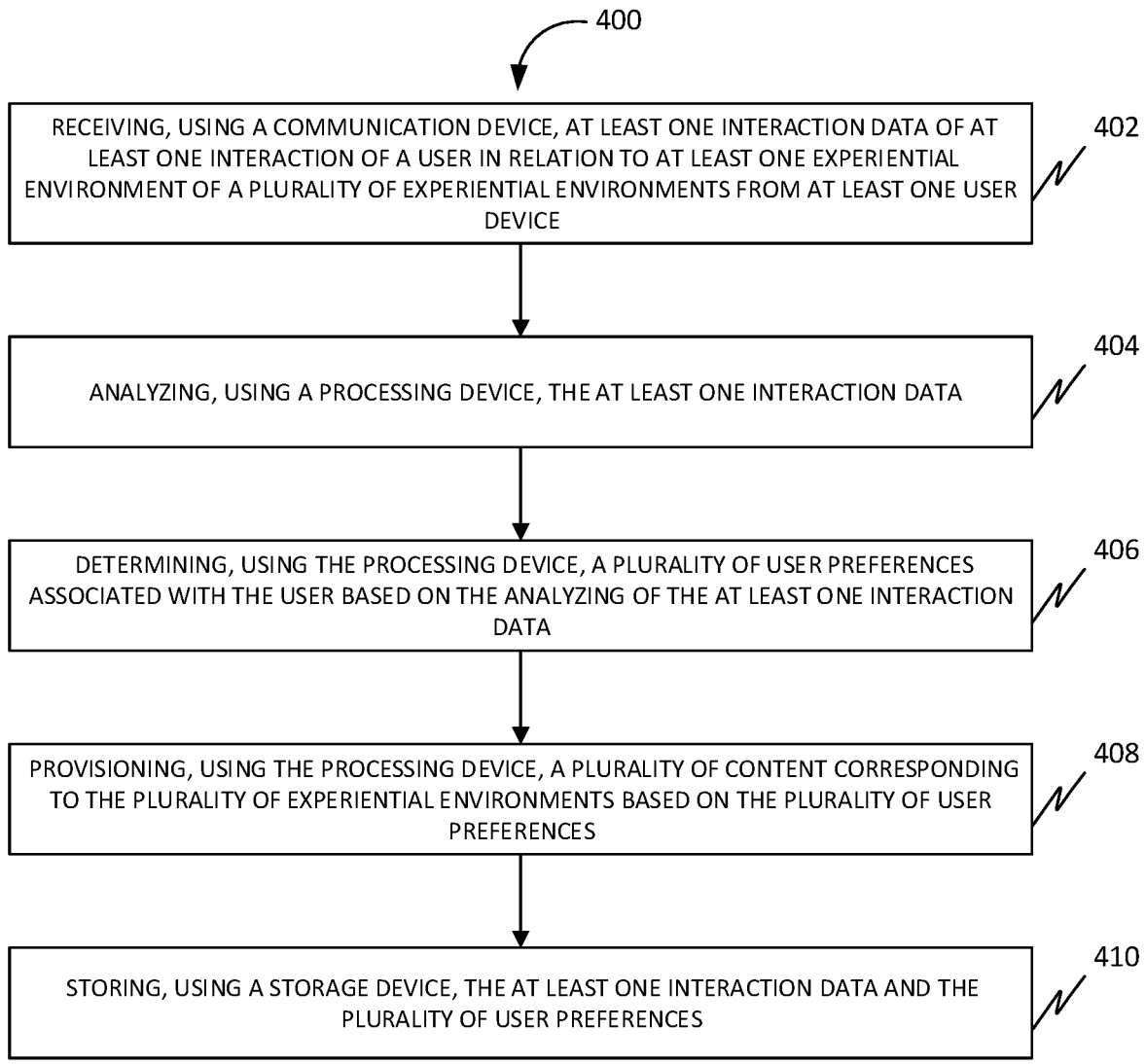
FIG. 4 is a flowchart of a computer implemented method for facilitating modifying environments based on user preferences, in accordance with some embodiments.

FIG. 4 is a flowchart of a computer implemented method 400 for facilitating modifying environments based on user preferences, in accordance with some embodiments. Accordingly, the computer implemented method 400 may include a step 402 of receiving, using a communication device, one or more interaction data of one or more interactions of a user in relation to one or more experiential environments of two or more experiential environments from one or more user devices. Further, the or more experiential environments may include worlds, be it virtual, digital, real, augmented, or any other realm of reality.

Further, the computer implemented method 400 may include a step 404 of analyzing, using a processing device, the one or more interaction data.

Further, the computer implemented method 400 may include a step 406 of determining, using the processing device, two or more user preferences associated with the user based on the analyzing of the one or more interaction data.

Further, the computer implemented method 400 may include a step 408 of provisioning, using the processing device, two or more content corresponding to the two or more experiential environments based on the two or more user preferences. Further, the two or more content may include elements of the real world, physical objects, virtual objects, social interactions, digital processes.

Further, the computer implemented method 400 may include a step 410 of storing, using a storage device, the one or more interaction data and the two or more user preferences.

In some embodiments, the one or more user devices may include one or more interaction detecting sensors. Further, the one or more interaction detecting sensors may be configured for generating the one or more interaction data based on capturing the one or more interactions of the user.

In some embodiments, the analyzing of the one or more interaction data may include analyzing the one or more interaction data using one or more machine learning models. Further, the determining of the two or more user preferences may include inferring the two or more user preferences based on the analyzing of the one or more interaction data using the one or more machine learning models.

In some embodiments, the one or more interaction data may include one or more historical interaction data. Further, the one or more historical interaction data may include one or more historical interactions of the user in relation to the one or more experiential environments. Further, the analyzing of the one or more interaction data may include analyzing the one or more historical interaction data. Further, the determining of the two or more user preferences may be further based on the analyzing of the one or more historical interaction data. Further, the one or more historical data may include user interaction data, recorded User preferences, patterns of use, historical data cache, and gamification trajectories.

In some embodiments, the one or more interaction data may include two or more direct indications of the two or more user preferences of the user. Further, the analyzing of the one or more interaction data may include identifying the two or more direct indications of the two or more user preferences. Further, the determining of the two or more user preferences may be further based on the identifying.

Figure 5:
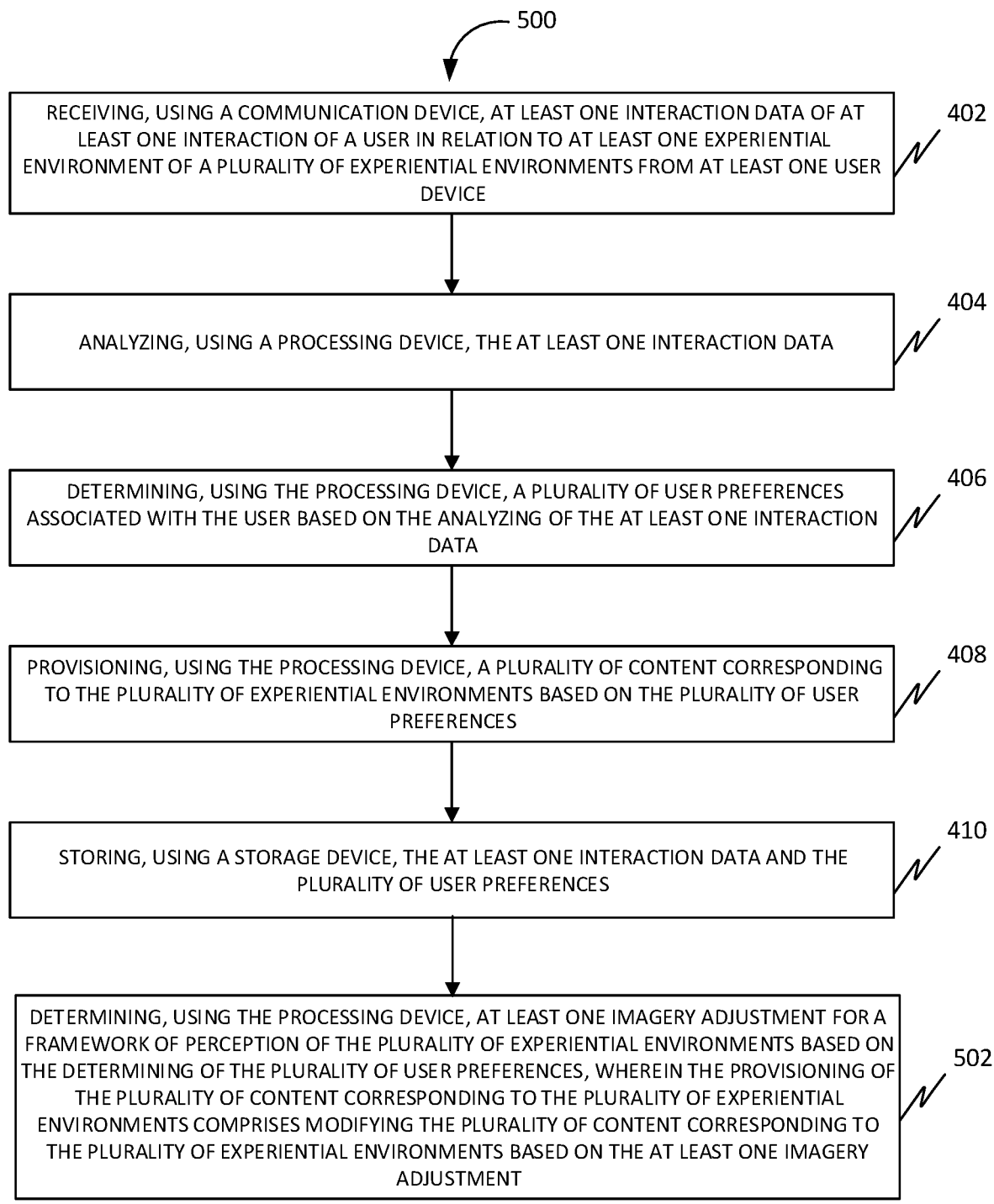
FIG. 5 is a flowchart of a computer implemented method for facilitating modifying experiential environments based on user preferences, in accordance with some embodiments.

FIG. 5 is a flowchart of a computer implemented method 500 for facilitating modifying experiential environments based on user preferences, in accordance with some embodiments. The steps 402-410 have explained in detail in conjunction with FIG. 4 above. Further, the computer implemented method 500 may further may include a step 502 of determining, using the processing device, one or more imagery adjustments for a framework of perception of the two or more experiential environments based on the determining of the two or more user preferences. Further, the provisioning of the two or more content corresponding to the two or more experiential environments may include modifying the two or more content corresponding to the two or more experiential environments based on the one or more imagery adjustments.

Figure 6:
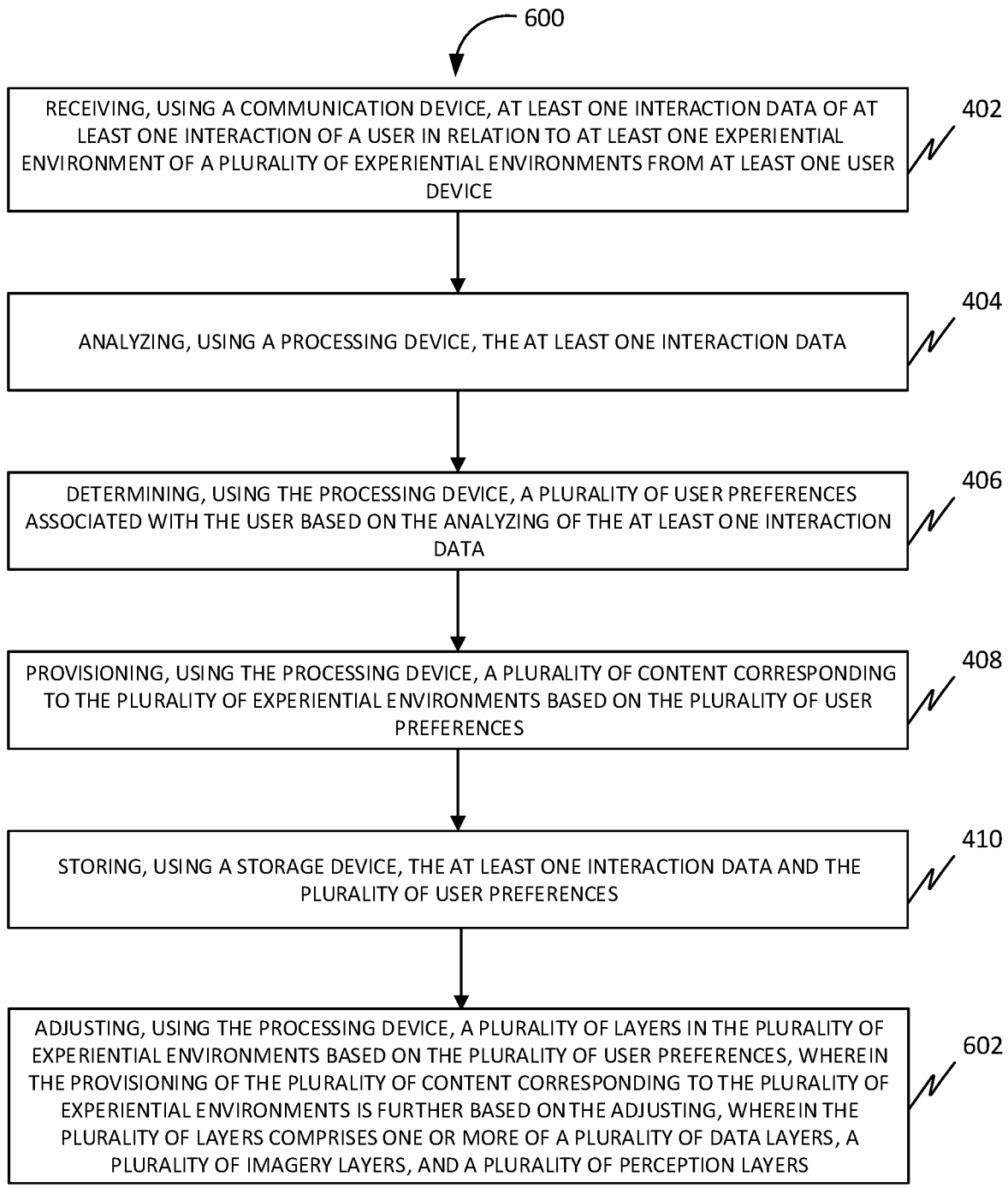
FIG. 6 is a flowchart of a computer implemented method for facilitating modifying experiential environments based on user preferences, in accordance with some embodiments.

FIG. 6 is a flowchart of a computer implemented method 600 for facilitating modifying experiential environments based on user preferences, in accordance with some embodiments. The steps 402-410 have explained in detail in conjunction with FIG. 4 above. Further, the computer implemented method 600 may include a step 602 of adjusting, using the processing device, two or more layers in the two or more experiential environments based on the two or more user preferences. Further, the provisioning of the two or more content corresponding to the two or more experiential environments may be further based on the adjusting. Further, the two or more layers may include one or more of two or more data layers, two or more imagery layers, and two or more perception layers.

Figure 7:
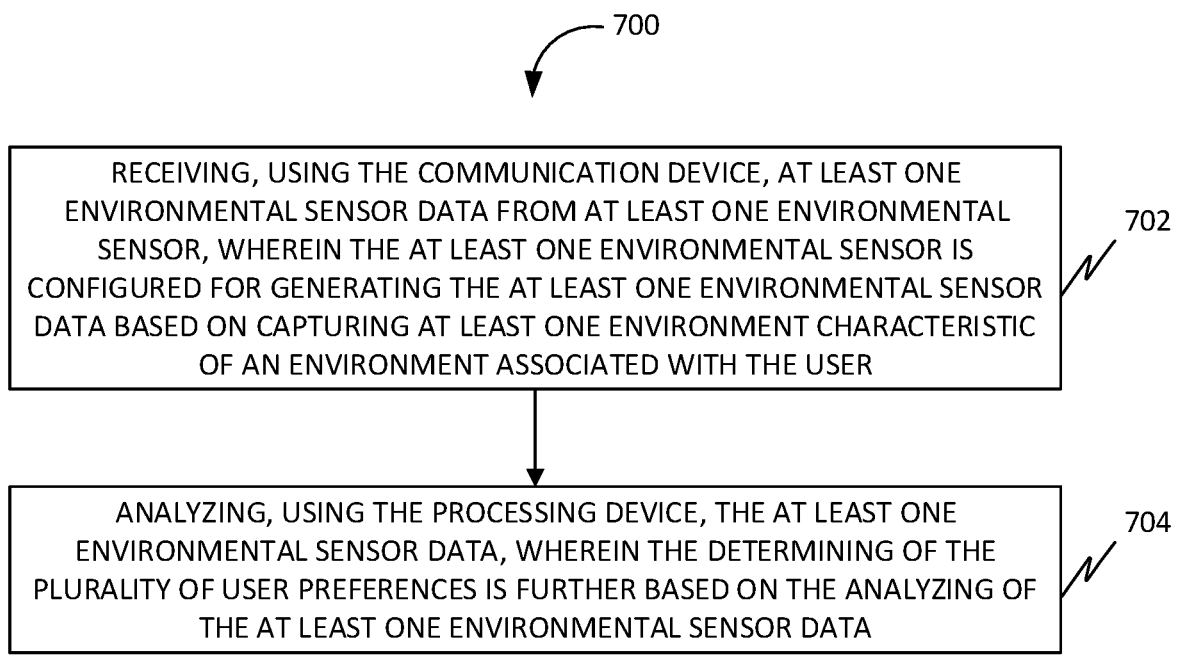
FIG. 7 is a flowchart of a computer implemented method for facilitating modifying experiential environments based on user preferences, in accordance with some embodiments.

FIG. 7 is a flowchart of a computer implemented method 700 for facilitating modifying experiential environments based on user preferences, in accordance with some embodiments. Further, the computer implemented method 700 may include a step 702 of receiving, using the communication device, one or more environmental sensor data from one or more environmental sensors. Further, the one or more environmental sensors may be configured for generating the one or more environmental sensor data based on capturing one or more environment characteristics of an environment associated with the user.

Further, the computer implemented method 700 may include a step 704 of analyzing, using the processing device, the one or more environmental sensor data. Further, the determining of the two or more user preferences may be further based on the analyzing of the one or more environmental sensor data.

Figure 8:
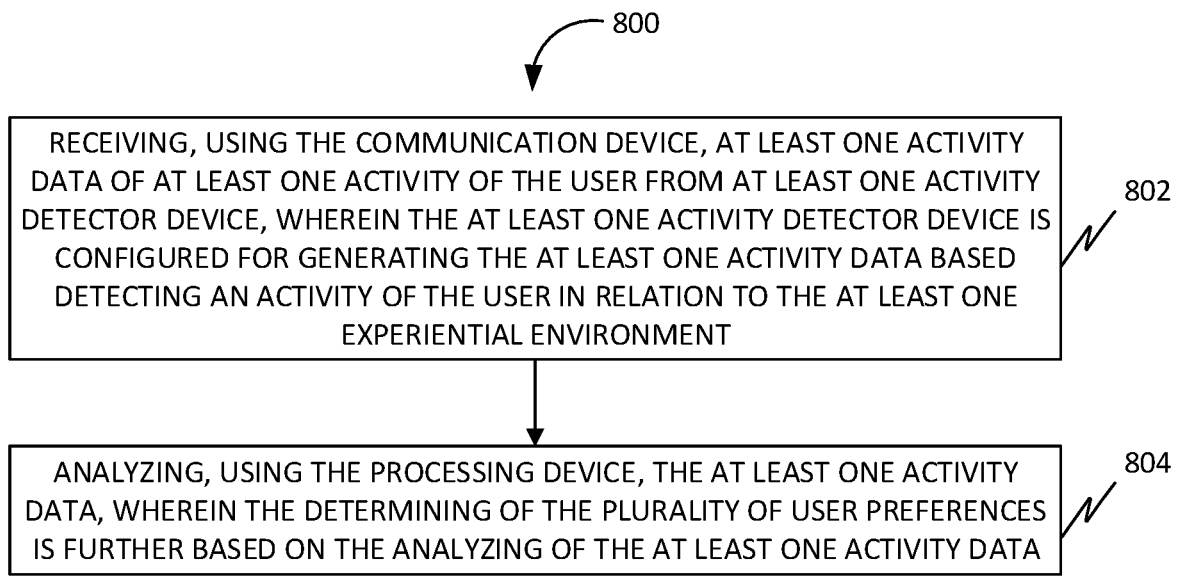
FIG. 8 is a flowchart of a computer implemented method for facilitating modifying experiential environments based on user preferences, in accordance with some embodiments.

FIG. 8 is a flowchart of a computer implemented method 800 for facilitating modifying experiential environments based on user preferences, in accordance with some embodiments. Further, the computer implemented method 800 may include a step 802 of receiving, using the communication device, one or more activity data of one or more activities of the user from one or more activity detector devices. Further, the one or more activity detector devices may be configured for generating the one or more activity data based on detecting an activity of the user in relation to the one or more experiential environment.

Further, the computer implemented method 800 may include a step 802 of analyzing, using the processing device, the one or more activity data. Further, the determining of the two or more user preferences may be further based on the analyzing of the one or more activity data.

Figure 9:
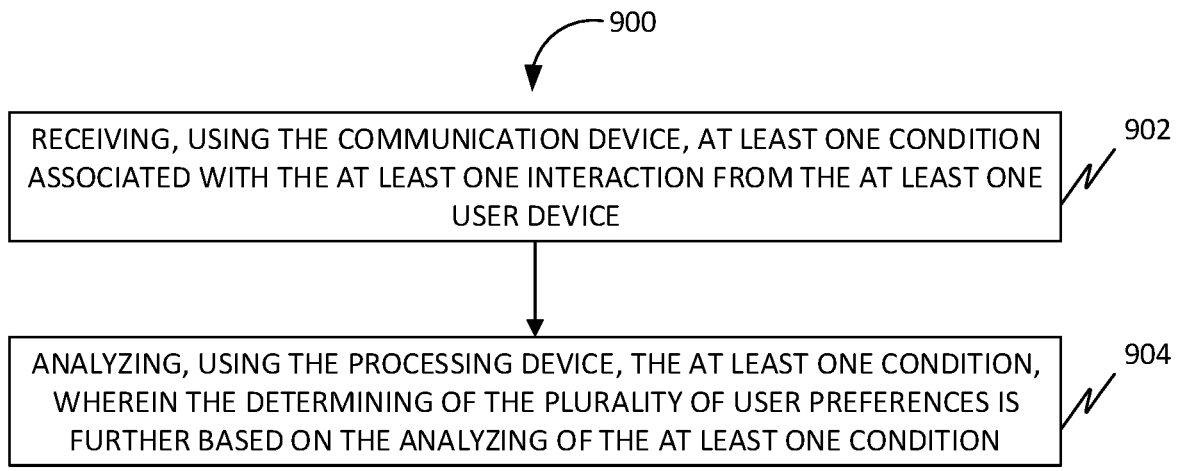
FIG. 9 is a flowchart of a computer implemented method for facilitating modifying experiential environments based on user preferences, in accordance with some embodiments.

FIG. 9 is a flowchart of a computer implemented method 900 for facilitating modifying experiential environments based on user preferences, in accordance with some embodiments. Further, the computer implemented method 900 may include a step 902 of receiving, using the communication device, one or more conditions associated with the one or more interactions from the one or more user devices. Further, the one or more conditions may include circumstances.

Further, the computer implemented method 900 may include a step 904 of analyzing, using the processing device, the one or more conditions. Further, the determining of the two or more user preferences may be based on the analyzing of the one or more conditions.

Further, the present disclosure describes a Celestification System. Further, Celestification is a system to redefine and completely redirect the functionality of a computer implemented, technology-based social networking platform. Such that a User of Celeste would be encouraged to leverage their interaction with the computer implemented method/system to augment their own reality in such a way that the User's preferences would be clearly reflected in real time across all active worlds, be it virtual, digital, real, augmented or any other realm of reality capable of responding to imagery adjustments made to the frameworks of perception.

The Celestification system proposes a fully integrated, multi-dimensional, interactive, and dynamic method to engage Users in their own custom tailored world. Where the User will be able to determine their own version of the system through their personal preferences at the moment, adjustable in real time, to the extent of API portals and system operations. Where the User will be able to adjust the active layers of data, imagery, and perception in their own personal world, thereby adjusting the features, elements, and overall system operation as it relates to the Users personal preferences through API and functionality portals represented by visual indicia in real time. This is accomplished through a network of integrated feature-portals staked to a multi-faceted encryption system, adjustable in real time based on the User indications directly, indirectly, and/or inferred, which will be further backed by trustless consensus protocols, smart contracts, deployable algorithms, and decentralized networking.

Celestification uses several integrated methods to tokenize and convert elements of the real world, physical objects, virtual objects, social interactions, digital processes. Furthermore, social contracts and processes such as purchasing products, providing services, networking, exchanging, tracking live activity data and the like; applying sensors and processing units to digitize the information seen or unseen (prediction AI) into data that can be further processed and implemented into a layered multi-dimensional interactive dynamic map-matrix system.

Where the map-matrix system will be superimposed over any visual interface capable of supporting layers of visually indicative information individually or stacked, this is not limited to a geo-spacial map, but rather map as a construct of visual information displays that may interact with one or more layers of datafied elemental information as it relates to the real world and/or virtual world events in real time. Where an event is considered any action capable of detection by the system that can impact the system based on the event detection and subsequent response of computerized event listeners, triggering a series of networked response systems accordingly.

Celestification comprises the technical functionality of a system capable of bringing the real world into the digital realm, and simultaneously impress technological functionality upon the physical environment, in real time, as the User of the system engages with the iconic filtering system programmatic language, essentially an application user interphase for the world.

The Celestification of the Users reality provides the ability to control the analog world and real world environments, based on User preferences, in real time, predicated on points, and belt level. Whereby, the User can engage the system to optimize their circumstances at present through the User selection, activation, deactivation, and/or pin of any iconic filtering element which includes any of an API portal, custom content, gamified element, or functional operation; such that the system will be influenced to operate in a manner, respective to the User's indicated preferences at present.

Celestification enables the User to leverage their environment in multiple realms and/or frames of reality with simultaneous effect as a result of the Celestification of physical, digital, augmented, and virtual elements; as they pertain to the Users indicated preferences. Thereby providing the framework for the User to create custom worlds, networks and elements therein to form axiom map layers that will thereafter be applied in series to a datafied map matrix infrastructure. Where a map will be considered any visual interface capable of displaying one or more layers of visual data based on the system operations as indicated by the User's preferences; map-matrix. Where the visual data will be viewed with or without extensive physical hardware such as mobile devices, laptops, or tablets; rather the visual data can be interacted with, acted upon, or viewed in an augmented real world hybridized reality using the DMT (decision maker technology) suite, digital avatars, and augmented interactive indicia.

The system is targeted to Users capable of interacting with the system in such a way that the system will be able to respond to the User and in doing so generate a custom reality for the User based on their preferences as indicated directly, indirectly, or inferred of the User based on their engagement and interaction with the system. Where their interaction may alter their reality instantaneously, based on real time feedback to any action, event, or data packet of consequence. Where the system can further augment the Users' experience based on data collected from environmental sensors, Beartooth dongle, hardware, and activity data collectors. This may then further allow the User to hybridize their digital and real world realities into their select perspective based on User Preferences, Avatar Interaction, Live Activity Data, and Active Map-Matrix Layers/Portals.

I. Celestified Map-Matrix System

The Celestified map-matrix is used as a canvas to enable the multidimensional layer formation of the Celestification system to superimpose a gameplan of functional elements based on the Users' indicated preferences using dimensional programming and calculations such as spiroidal programming with real time processing. Where the functional iconic data packets can contribute to the interactivity and overall functionality of the system, further according to the Users' specifications and the subsequent system modifications as a result.

The map-matrix system is composed of one or more layers of datafied information and/or functional portals as they are indicated by the User through their direct interaction with the filtering system and/or indirectly through their inferred preferences as understood by their User experience data and activity data. Where map layers can be datafied through three dimensional programming for GPU processing to produce functional node map layers and GUI elements capable of spiroidal rendering dynamics.

Further, this system of data layering allows for the User to visualize the elements of "their world" through a visual indicia map, which is not limited to the static understanding of a map depicting geo-location or the basic understanding of physics. Rather, the map matrix is indicative of the collaboration of visual elements layered into a visual matrix that will indicate a plurality of functions, or otherwise, in a dynamic visual representation of both macro and micro system operations. Where the operations can be interacted with in any of a virtual, visual, physical, augmented, or digital manner, which may be further automated, artificial, simulated, or Else, where potential actions can include any of a prompt, layer, function, element or event to be triggered for the User and/or the system to engage.

Should the engagement matrix be satisfied, the map will produce interactive representation(s) of the backend preferences such that the User will be able to see, hear and/or feel their preferences in real time within the virtual matrix, and/or the physical realm. Allowing for them to simultaneously interact with the digital platform and the real analog world, in real time, based on their preferences for what their worldview should represent.

The Celestification process will allow for the datafied elements of the real world to become digital assets in the system, such that the elements would now be able to be acted upon as a digital element, that can also have real world consequences. This provides a plurality of opportunities to maximize the effect of User data on the system, the datafied elements, the network, and the overall operation, where the User may build out new elements, trigger event listeners, network several event nodes, connect event nodes in a series operation; where a subsequent series of event listers will trigger a multitude of responses, zoom out into Skyview of unlocked locations, drop into zones as an avatar, etc. such that a User can engage the digital reality and real world happenings in simultaneous activity streams of virtual avatar interaction and real world datafication.

Where Celestification signifies a Users ability to create and engage in experiences across multiple realities, with feedback response loops and real time consequences based on gamified governance rewards matrices, as further impacted by the active layers within the map-matrix as determined by any of the User Preferences indicated and/or User system interaction.

II. Opportunistic Datafied Mapping Techniques

Opportunistic datafied mapping allows for the Celestified map-matrix system to prioritize the User experience in regard to how the map may be interacted with. Where a map can be viewed as a gameplan, a game board, a geo map, blueprint, 3d model, a web of nodes, or the like, such that a User would be able to activate data packets that have been dispensed, and/or layer element functionality for optimal User experience and system operation. Where hardware integrations will further enhance the system operation, though is not required to be hardware-centric.

The opportunistic datafied map-matrix system further provides gamified User access to caches of data packets, deep links and node connectivity, trail networks, genie filters, smart API portals, personal augmentation, real time datafication and/or streaming, imbedded packets of information, connection, gamified rewards, challenges and the like, where the User may be able to activate one or more elements through gamification interaction-detection worldwide event listeners and further convert their selection to a functional layer within the map-matrix.

Opportunistic datafied mapping enables elements to be triggered based on opportunity, perception, and/or threshold, where the element may be activated by a predetermined setting, such that a User will either have to satisfy a threshold barrier or interact in a way that the opportunistic element is predicated to operate. In doing so, the map would respond to the Users' interaction beyond direct filtering, such that the Users' interactivity with the system would produce calculable results that may be weighted against the element's opportunity and/or threshold matrix.

Where a User may trigger an element by triggering an event listener to prompt an event to occur, where the User can then receive real time feedback from the system as it relates to the event, and/or technical element operation. A myriad of potential triggers can stimulate an event listener to modify the map matrix based on a User interacting with the opportunistic mapping system, such as geo location, level, network connections, virtual location, or otherwise, where a User can alter their interaction in any manner that may affect the system, which may, in some cases trigger a system response; event.

Further interaction with the system, would provide additional data of physical assets, behaviors, usage patterns, network connections, interpersonal or business relations, preference of use, proof of work, proof of object, proof of space and time, and ultimately predictability matrices as they relate to the User and their preferences, patterns of preference or deduced trajectory of preference. Whereby, the system can link a series of worldwide event listeners, data packets, and smart profile rewards to accommodate, direct, or compliantly adjust the Users' experience according to their smart profile data matrix, which is based on their interaction; direct, indirect, or inferred.

Furthermore, these elements will be linked to events/event listeners that are most suited to the User based on their interaction, preferences, and access level. Where gamified elements will be triggered according to the User's interaction with the system, prompting the User to interact further for gamified rewards of physical assets, virtual assets, access, mood, or otherwise rewarding behavior. Though, they will only be prompted by events that their assigned event listeners are keyed into, whereby the User won't be bothered by events that are not suited to their User preferences or interaction(s); where an event is any point of action, triggered and pushed to a User, without any dependency on physical location, theme or person, though in some cases any of the aforementioned may be involved should it satisfy the Users interaction type/preferences.

Where the events are further determined based on the User active layer matrices, where the layers and activated events are able to save the User data space, and thereby create a faster and more efficient system without the extra junk data floating around that the User is not interested in and/or does not directly benefit the User or the system according to their indicated User preferences. Thereby streamlining the system through constant machine compression to operate more efficiently, even when a User has activated several Layers[Portals/API's/Features/Functions] into their User map-matrix system because the system is only prioritizing that which is necessary to operate or was otherwise indicated directly, indirectly, or inferred based on User preferences.

Any relevant information regarding the Users preference(s) is then relayed to the opportunistic mapping system, where links, nodes, events, data packets, layers, API portals, visual indicia, networks, or other interactive, gamified elements can be adjusted to better suit the User according to their interaction. Providing the User with a visual map matrix, reflective of their patterns of usage, gamified achievements, indicated preferences, activated portals, themes, network choice, connectivity, and preferred use at that time i.e challenges, other Users, trails, iconic indicia, visual indicia, points of action, mood gauge and/or interest currently relevant to the User. Where the User can interact in real time. Further, the User can also stash the map-matrix data in a geo-cache or on a Beartooth dongle to support offline access or future download.

III. Gamified Smart Profiles

Users of a Celestification system implementation will be operating through their User profile, the Celestification of such profiles would enable the User to engage with the system through a process of gamification methods. Whereby the User will be encouraged to interact with the system to gain platform rewards through the incentivization matrix.

As a result, Users will be prompted to engage with system elements to earn incentives that can be tailored to the Users indicated preferences, such that; a User will be able to excel through the system in a manner that is best suited to their personal objectives according to their accomplishments/rewards. In this case, the User may be prompted to follow certain objective pathways that can lead to their advancement through the network, increasing their value within the system.

For example, a Celestified profile would engage with a plurality of gamified system elements such as:

I. Belt Levels: Indicating a Users overall system rating and the access granted to the User according to their belt level. Belt's are color coded indicators of a Users ability to interact with the system, their performance threshold, and the Users system access. As a User levels up, so does the User's ability to interact with the system, through more portals, features, elements, and increased functionality based on their Belt level.

II. Feedback Ratings (LOOP): Feedback loops to rank, categorize, and organize User profiles based on the Users' overall effectiveness within the system. Where their effectiveness will be determined by their category, experience/XP (experience points), belt level, or pathway, as it relates to the overall Celestified ecosystem and the Users' interaction accordingly. Feedback loops assist with Real time responsiveness and personalized accuracy.

III. Rewards: The Gamified Governance system uses a rewards matrix to incentivize User's interaction according to their User preferences, active layers, pathways, etc. Whereby a User will be incentivized to interact with the system to produce a result that will then be rewarded to gamification methods such as points, badges, access, tools, tokens, keys, mission levels, connection, or otherwise gamified methods of incentivization for User interaction. Where these rewards matrices are dynamic and develop actionable elements that can be further aggregated or applied to augment the User experience.

IV. Badges: indicators of User experience, skills, networks, clubs, access, or the like, where a User can earn badges to prove a multitude of forms of their accomplishments. Badges may grant Users access or increase their ratings, or augment their experience through rewards matrices tied to the badge accomplishment(s), unlock special challenges, or hidden keys.

V. Pathways and/or Trails: Series indicators of nodes to trigger User responsiveness and interaction towards a task, mission, or goal. Where a node series (pathway/trail) can be created by Users (influencers or trail blazers) or by the system as either customized series (pathways) or populated series (trails) that can be pushed to the User or select public respectively. In either case, node series will be micro or macro in scale, where Users can accomplish a short mission, or a complex multi-mission objective, both are gamified with incentives, task markers, ratings, and the like to engage the User throughout the series. Completion of a node series would yield rewards for the User, and where applicable, for the creator (e.g., AD revenue, data mining).

VI. Joux Points and Experience Points: A points system is integrated to track the Users' interaction as they rank up, as other rewards require a higher threshold of achievement, the User will more readily be able to earn points through their interaction, and therefore is measurable with greater frequency. Joux points are indicative of a value system that will be earned, bought, or exchanged, joux can be used as currency or traded for and/or staked as currency in basket currency systems. Whereas, Experience points (XP) are earned for interacting with the system, where Users will gain experience points based on their experience(s). Experience points can be converted to joux at an exchange rate through do not hold a currency value for outside exchange otherwise. Rather, the experience points value is primarily towards contributing to the User's ability to level up, earn rewards, and trade for gamified tools or access.

Potential benefits of Celestified smart profiles would include providing Users with incentives to engage and remain active within the system matrices to increase User productivity, and therefrom, through a series of interconnected rewarding feedback loops allowing user access, wherein user access may pertain to the user's ability to interact with the system in any of the digital, virtual, or physical world realms that the system actively engages in, and wherein the user can be incentivized to level up through accomplishments to increase access to elements such as content and connectivity.

I. Content: The element of content may pertain to elements such as influencer campaigns and the elements therein, trails and the elements therein, streams, communication elements, as well as access to portals, icons, and dimensional layering capabilities.

II. Connectivity: The element of connectivity establishes the threshold of the User's ability to connect, network, and interact within the system. The more access the User is awarded, the greater their ability to make connections with the interactive elements of the system such as augmentation, communication, as well as access to projects, funding, workshops, networking opportunities, contracts, zones, caches, and other exclusive content.

By modulating the Users access based on their level of interaction and achievement, the User will be better able to maximize their time, only engaging in what is applicable to them, or indicated by them, or potentially beneficial for their advancement in the system, or otherwise capable of improving the Users personal experience.

Two main elements determining what is unlocked regarding User access are the User's accomplishments and the User's indicated pathway(s). This allows for the User's experience to remain personal to the preferences indicated, which also means that each User can have a different perception of leveling up, and accessibility.

I. Accomplishments: The Users' accomplishments are determined by their ability to complete an action within the system, whereby an event will be triggered of consequence to said action. This is a responsibility of the incentives and rewards feedback matrix, which applies gamification to the accomplishment-reward feedback system, in real time. Accomplishments may include completing a task, milestone, or challenge, and any elemental feedback therein such as location verification, operation verification, connection verification, and/or the like. For instance, if a User were to accomplish the first three tasks pushed for adding team members to the network, they can achieve a milestone badge like "novice recruiter"; with this accomplishment, the User may also receive access to a communications board that promotes business networking and a free networking seminar streamed to other "novice recruiters", should the User complete this seminar and network with other people therein the User can achieve a new accomplishment, and so on; increasing their access based on accomplishments.

II. Indicated Pathways: A pathway is considered a pattern of behavior noted based on the User's interaction and indicated preferences. Such that, a User is to use the system to suit their interests, these interests are liable to align into a recognizable pattern, this pattern can then be categorized based on common trends into a pathway with predictable future momentum and therefore calculated opportunity for upward mobility. For instance, a User may be showing indications that they are interested in technology and development, this User has completed contracts, attended seminars, and networked with other tech-minded people, working themselves into a higher belt level standing and therefore was awarded greater access. Should the system recognize that this Users pattern of use indicates a pathway that is geared towards technology and development, the User can be promoted activities and events that would advance the Users potential future growth; such as attending an exclusive tech conference or being invited to compete in a hackathon or join a novice tech business networking group.

III. Pathways and Trails a. A pathway is an indicated trajectory of the User's interaction. Where a User will be prompted to follow a series of nodes/events "pathway", wherein the User will happen upon challenges, opportunities, and achievement nodes that the User can interact with to potentially satisfy and continue to move forward thereafter towards the Users objective(s). A pathway is intended to satisfy a Users objective through a series of tasks and milestones, where the Users achievements, interaction, and dynamic profile metrics are recorded, and upon satisfying the threshold to surpass the current node(s), the User will progress to the following in series. If there is more than one option for the User to choose from, upon completing the current node, the User will be prompted to choose their next mission (e.g., task or milestone; where the completion of an indicated challenge, event, or action is required to satisfy a task, and multiple tasks make up categorical milestones, with multiple milestones making up an objective, and one or more objectives contributing to a Users pathway).

b. The User pathway system will promote their interaction with the system, such that they can receive gamified rewards, unlock new nodes, and decide their own trajectories, whilst still being able to reference the system evaluation metrics on which node would be best suited to the User based on their smart profile data (e.g., their interaction data, recorded User preferences, patterns of use, historical data cache and gamification trajectories). Where for example; a User may satisfy a node in their pathway, and looking to move forward is presented with three potential options (as an example, for there could be one option or a plurality of options), which could be any relevant element event that would prompt User action to satisfy in any of the real worlds, virtual reality, digital world and/or augmented reality node threshold. Upon being presented with the three node-trajectories, the User can select any one of them to learn more about the node's requirements for satisfaction, which can include a description of the node, difficulty level, commitment level, cost, a realm of action, potential embedded rewards (e.g., gamification metrics such as level, badges, joux, themes and the like) and potential benefit, such as how the node will affect the Users objective(s) and/or their User profile, such as their belt level, access or other profile ratings, visually displayed (e.g., in a character development story board tree).

c. Whereas, a trail is an indicated network of nodes connected by another User (influencer/trailblazer) or the system (as a direct push, embedded trail, or cached/exclusive/hidden trail) for Users thereafter to follow and potentially complete the trail. In the case of User-generated content, the trail is established by a User of higher belt level, often referred to as an influencer or a trail blazer, though this is not required; titles and tags are gamified elements rewarded to Users who focus their engagement on producing User generated content, networking, and have interacted in their pathway(s) enough to satisfy a high enough belt level to earn the title(s), tag(s) and/or badge(s) required for a higher status in the system. Though trails or elements of a trail can be logged by Users without these tags, however, the rewards will not necessarily be provided to them until they are qualified. For Example; three Users would like to generate node content, (1) is a new User who doesn't have the credentials for node establishment, but flags a point of interest for the system to look into/send an influencer to validate, (2) is a business owner, who can verify their business, and post it as a node, with relevant challenges or node actions related to their business, (3) is a well established User with influencer credentials and a high belt level, therefore this User can create entire node series/trails for other Users to follow.—these are three general examples of User standing in node creation of many, and restrictions will be placed depending on the User's level and allowance metrics.

d. A trail may be indicated as any combination of nodes, connected to produce a node map snake_trail that will be interacted with by the User in series or otherwise. Where a node can pertain to any event; challenges, venues, locations, tasks, objectives, beacons, or any other event that may be detected based on User interaction. Node maps are generated based on trail blazer interaction, where the trail blazer can indicate any node-worthy elements to be implemented into the network of node-events; where an event is indicative of any action detectable by a computer implemented system through integrated event listeners, and/or event handlers. Where difficulty level, commitment level, cost, a realm of action, potential embedded rewards (e.g., gamification metrics such as level, badges, joux, XP, themes, and the like), and potential benefit can be pushed to a User to promote the trail.

Further, Trail Blazers are influencers capable of producing custom content, which may include any actionable events as nodes in a node-event network, producing a node map that can then be applied to one or more of a User map-matrix layers. These trails can be applied to the Users map, where a User will interact with the trail directly as an outing pre-set or allow it to generate as the User crosses the radii trip wire established by the trail in either geolocation, a digital location, or in accordance with a point of threshold (by the Users live activity data, avatar movement, or interaction rewards respectively).

I. Trail as a pre-set: this indicates a node series of events, activities, and challenges combined into an outing that User(s) will engage in as a mission and/or challenge and/or theme oriented outing amongst one or more Users that may be participating individually or as a group. Where an outing is a series of actionable events, in any of the digital, augmented, or real world elements indicated by the corresponding event node(s).

II. Trail generated: this indicates that a User may have one or more trails active in their map layers. Such that, the User can receive a push notification, corresponding to an event action as it was triggered by the Users interaction. Where a trigger pertains to a physical, digital, or threshold point of action, such that an event listener would be triggered based on User interaction to generate a prompt for User interaction with the trail node event.

Further, trail blazers will be incentivized for the creation and maintenance of trails. Where a trail node can also include gamified elements such as hidden tickets, tokens, targeted Ads, targeted rewards, completion incentives, purchase-oriented nodes, augmented Ads, games, and/or the like whereby the trail blazer can earn a commission incentive based on the node activity (e.g., the number of participants).

Further, trail blazers and influencers can also be incentivized to push their iconic preferences in addition to their trails, where other Users can download the trail blazer/influencers preference array and trails into the Users preference array/trail layers so that they will download the experience matrix and live the life of said trail blazer/influencer. Again, trail blazers and influencers may receive a commission based on their engagement level and a number of downloads generated by their trail(s) and/or preference array(s).

Further, the aforementioned elements of a trial can be implemented in a real time experience hosted by an influencer, or the creator of the trail whether that is a User, Influencer, or System. Such that the real time experience will provide the Users with a live stream that can be further augmented with integrated stream augmentation features, and/or embedded incentives that can be augmented. Where these features may prompt a User to engage with the Influencer such that the User can provide feedback through a series of actions, indicating their position to the real time experience; for example, a User may be prompted by a geo fence to view a stream relevant to their current location (or the location of their avatar), pushed by an Influencer, should the User choose to engage with this live stream they can, in this example, encounter interactive elements such as RYG lighting, augmented surveys or polls, gamified participation feedback loops and virtual maps, trail incentives and/or augmented smart ADs; targeting the User based on their direct and/or indirect interaction such that their preferences, location or otherwise can trigger an augmented AD.

In terms of activity data, the Celestification system will incorporate datafication protocols to integrate physical elements, experiences, and actions into the virtual matrix within the digital system, moreover providing the physical reality with digital, virtual, holographic, or otherwise technologically generated and/or enhanced elements that may be integrated.

Through the combination of CPU's, GPU's, ALU's and GUI's processed via machine learning, inference engines, compression algos the User will be able to datafy the real world in real time based on their interactions with the aforementioned systems, whereby the User will assist the system in developing a datafied real world. Such that a User would be able to interact with any of the aforementioned systems whilst engaging in an activity such as walking around a city, in doing so, the User would be able to log the physical assets as datafied objects simply through their interaction with the Celestification system and the elements therein.

Providing the User with real time access to assets in the real world through the virtual system, and/or producing feedback of interaction, based on the Users interaction, with said datafied element in the real world, the virtual world, the augmented reality, the digital sphere or otherwise as it pertains to a dynamic system operating in a multitude of realities simultaneously.

Whereby activity data is generated by Users in real space based on their real time interaction as it is detected by the system through direct, indirect, and/or inferred data collection, evaluation, and aggregation, as it relates to their smart profile data matrix including potential impact to their User preferences as they are understood. Whereby, the arithmetic logic that processes instructions (fed by the User interacting with the real world whilst using the Celestification suite), whereby the datafied logic processing will further augment the system with machine learning and gamification rendering suites. Such that the User's interaction with any of the real world, CPUs, GPU's, ALU's, quantum flashes, and GUI's will render the real world data into map-matrix layers capable of powering a dynamic virtual world reality, with streamlined augmentations and machine learning preferences.

Where, activity data will be further enhanced with the integration of hardware devices capable of working within/without the Celestification system, such that the hardware will contribute to datafication, activity data, gamification elements, augmentation elements, avatar control, or the like. Where User activity data will contribute to the User's smart profile, preferences, and/or the system network. Where a User can contribute to the system maintenance, optimization, and/or content creation such as a trail(blazer), influencer, guide, contractor, Productivity Network operative, apprenticeship master, map matrix layers, or otherwise.

Augmentation of the User experience through the Celestification of their environment(s) can be achieved with the incorporation of hardware devices such as those within the suite of Decision Maker Technology (DMT) hardware that is readily adapted to the Celestification system. Such that, the applicable hardware has been designed to produce and detect data based on sensors, activity, observation, evaluation, augmentation, or otherwise, where hardware is capable of developing a world view in real time based on data feedback systems. A world view that may be impacted by User interaction in the real world or digital/virtual world in real time, where User interaction can be augmented into the real world or datafied into the digital world, producing results and feedback loops in both cases to further incentivize User interaction with gamified governance methods.

In terms of gamification and gamified governance, the gamification of the system operations would further enhance the User experience by increasing their interaction and participation in multiple elements of the Celestification system. The gamification method provides Users with feedback outcomes that ultimately increase their likelihood of engagement. This is further developed with Celestification, through the process of augmented gamified governance. Where the operation of the system is directed, maintained, and optimized through governing techniques based on gamification methods. Such that, a User can be rewarded according to the parameters of the system, and the intended objective as it relates to any indications by the User, their personal preferences, their inferred preferences, or the indicated trajectory of their activity data.

Furthermore, the gamification methods coupled with the inference engines will enable the system to connect on an emotional level to the User, with mood gauges, DNA Rating system, and boredom recognition systems to determine a Users mental availability, and further determining what the User needs; interacting with them in a gamified manner that allows for immediate engagement, based on User generated data and the inferred response analytics. Whereby, a User may indicate personal preferences, intentions, objectives, or interactions through gamified system elements, which the system will then feed back into their smart gamified profile. Thereby providing detailed methods of communication/data transfer between the realms of human emotion via mass comparison machine processing.

Where the Users smart gamified profile will be able to interact with the system, based on User interaction, such that the Users objectives, interactions, daily operations, rewards, and the like can be used to produce gamified results including feedback matrices that will therefrom further augment their User experience based on their direct or inferred preferences and/or interactions such as milestones, badges, belt levels, points, bonus missions, prizes, connections, access and the like. Where Users will receive any of the aforementioned, or feedback elements of the like, based on their interactions where a User will be required to satisfy an activity threshold to unlock the element.

Further, gamified elements can become augmented elements of the digital, and real world environments, indicating that there is a node action of any type and populating the node action(s) accordingly.

Where augmentation of elements, layers, or events will prompt the User to interact with the system through the method of gamified incentivization towards the intent of governing the system operations based on User preferences and activity data. Such that a User will receive system feedback and/or rewards of any type which can further contribute to their overall experience, engagement, and/or opportunities. Where Users will be rewarded for their achievements and potentially restricted otherwise until they have satisfied the threshold to unlock any incentive such as a new level, point of access, location, network, feature, title, bonus, project, payment, invitation, augmentation, skill, or the like. These rewards and feedback matrices can be presented to the User as an augmented element, virtual element, or otherwise, where the User may be able to interact with the system based on visual stimuli/indicia. Such that any of a hologram, projection, color augmentation, movement augmentation, virtual blending, hybridized visual stimuli, illusion, or otherwise iconically indicative of an event detected in the physical, digital, or augmented realities/worlds may be represented (e.g., visual augmentation) and therefrom acted upon to satisfy the system push, prompt, or otherwise. Where a User interaction may include the use of a touch-sensitive holographic, or otherwise augmented display, such that the holographic display can be projected by hardware, or visually stimulated by software that will further incorporate the use of a spacial light modulator, optics, and sensor apparatus or the like, reducing the burden of extensive hardware use.

Further, the gamified governance method is to promote and manage the maintenance of the User preferences and system operations within the Celestification system, where any of the aforementioned will be evaluated as a group/network or individual/node based on the event recorded and stamped in real time, where an event is anything that can be detected by an event listener in the system. This information is then processed to generate feedback mechanisms based on parameters and threshold matrices as they relate to any of the User's indicated preferences, inferred preferences, objectives, or activity data. Gamified governance is a method of providing a system with optimized functionality, tailored to the User, where the User will be prompted to interact with the world, as the User indicated through their interaction.

Moreover, the User will be further able to merge their real and digital worlds into a hybridized model of their preferred lifestyle as indicated through their system interaction. This is a highly customizable system that is built to suit the User based on their real time preferences, such that the User may be able to completely shift their world view based on their real time preferences, through the modification of their indicated preferences such as API portals activated, layers present and/or absent, features active, networks connected and/or disconnected, and gamified features such as augmentations, iconic elements, visual indicia, feedback prompts, and the like to be modified by the User in real time, ensuring that the system remains dynamic to the Users dynamic lifestyle, as an adaptable personal life filter and enhancement tool backed by gamification and governance systems.

Further, Celestification will allow for the interaction with datafied assets and gamified elements. Such that a User may engage with the real world elements and digital, virtual, and/or augmented world elements in real time and/or simultaneously. Whereby, the User interaction with said elements may produce a result that can adjust their view of the system, and/or the User may further adjust their preferential parameters indicating their system preference, which will therefrom affect the datafied assets and gamified elements accordingly. Such that the aforementioned will be impacted by the User's interaction wherein any of the aforementioned will be encased within an API, portal, layer, element, feature, augmentation, or the like.

In terms of seeing the board, the Celestification system will generate a myriad of gamified interactive User interfaces using computer implemented methods of graphical User displays, real time connectivity, OS functionality, and data security. This will require the system to be able to connect to a network, relay signals, and information sharing based on system operations and technical load.

Therefore, due to the demands on the network to be able to function even in remote or isolated areas, the network is capable of on-grid and off-grid, via Bluetooth, 2G, 3G, 4G, 5G, WiFi, Satellite, GNSS, mesh, ad-hoc, Beartooth, etc. As well as through hardware components and/or Beartooth dongles that can be used to connect the User as well as give them the ability to generate their own server/ISP. Alternatively, WiMAX in locations where large numbers of Users require a network connection, or Ether Boxes, can also provide service to a User within their hot zone. Further, people can act as repeaters, these Users may have a higher than normal EMF reading/Bluetooth capacity and are capable of relaying signals through their Bluetooth connectivity (i.e., human antennas), these people will be referred to as AMP-Antennas (AMP-A), where AMP-A may also use antenna incorporated garments, implantable devices, medical chips, etc. such that any User can be incentivized to become a human antenna, repeater and/or a server/ISP where the User will receive an incentive for the service provided to expand and/or enhance the network/connectivity.

Redundancies for network connection will ensure that the User(s) of a

Celestification platform will always have access to data and OS functionality. In the case of a network shortage, data packets can be stored in select geo caches, where a User will retrieve select data based on their preferences and access.

Further, where select nodes will also act as servers, hubs, and/or skyports/etherboxes, thereby providing node-centric connectivity on-demand which will be enhanced by dome hardware (e.g., C-Buckyballs and C-Orbs) where networks will be established on-demand.

Further, larger service redundancies will include providing data centers for User interaction, such as gateways and passports, where Users will be able to access the Celestified network.

In terms of the Celeste platform, Celeste is a computer implemented method of producing an interactive networking experience engine with integrated gamification systems for increased interaction with Users, and management with the gamified governance system built with the Celestification method, system, and matrix.

The Celestification of any system is productivity and challenge oriented, with gamified rewards matrices to increase User engagement and objective maintenance. Where the celestification of any asset, event, or realm would take datafied objects, actions, or essences and integrate said data into a visual map-matrix, where a map-matrix indicates a multi-dimensional layered matrix of visually indicative data such that a User will engage with a multitude of system operations, through these layers, in a visual, iconic and/or otherwise augmented display. Where the visual display may be viewed within a mobile device, without a mobile device, as a projection, soft hologram, or through a GUI displayed within hardware devices that provide heads up display augmentation. Celeste will be able to connect the User to their own custom world, where they can interphase with technology systems, modify their reality and enhance their experience through trans-world interactions, such that they may project digital reality onto the real analog world, and datafy the real world into interactive assets within their virtual digitized realm.

Through enabling Users to customize their environment to suit their personal preferences across several layers of lifestyle engagement such as people, places, services, things, activities, events, challenges, travel, diet, health, weather, etc. Celeste is providing a new system for networking (social, digital, physical). Where the end User is able to leverage the system to suit their personal preferences on-demand in real time with gamified response matrices.

Celeste will allow the User to effectively modify the system operation, through their interaction both directly and indirectly to leverage the number and variety of system operations, portals, feedback loops, and operational features that are active and/or inactive and/or satisfied and/or unsatisfied at any instance in time. Thereby, modifying the platform to suit them in any design, functionality, features, augmentation, connection, focus, network, objective, program, layering capabilities, portal access, security, storage, data, and the like, where the User will adjust any system feature such that their world(s) are unlike any other (i.e., each User can customize their own world(s) to suit their User preferences and User interaction in real time).

Further, that the User's world is not relegated to digital or virtual reality, that the experience the User indicates/creates through their interactions will ultimately yield real world results. Where real world results may include hard holograms where User(s) can interact with digital elements, tangibly realized in the real world.

Further, that the real world results will be relevant to or affected by gamification systems, such that gamified feedback loops will augment or be augmented by the real world elements. Where a User's smart profile will experience alterations based on gamification system elements, which may further alter the User's experience by adjusting the preferences, and all subsequent layers therein, which may alter the virtual, digital, augmented environment(s) of the User's map-matrix. Such that the User's world will now be affected by new features, restrictions, or abilities based on the gamified feedback according to their system interaction directly, indirectly, or as detected. Affecting their network load.

The Celeste system will create a multi-dimensional layered mapping matrix that accommodates a plurality of actions, events, system operations, and pathways, bringing augmented trans-world connectivity and dynamic real time interaction. Where real time personalization of the system operations, display, and system potentiality through an iconic filtering system is capable of shifting the bounds and capabilities of the platform to suit a User, specific to their User preferences. Where everyone is able to be in their own realm, determined by their smart profile, capable of instantaneous alteration based on the User's interaction with any of the system elements, particularly as it relates to their User preferences; affecting the system operations by way of API portals, functionality, features, elements, levels, layers, networking, connection, etc. Where everyone is interconnected in a network, connected to the real and virtual worlds simultaneously, through the lens of their own world view point capable of real time alteration with integrated gamification feedback loops.

The Celeste operating system is an example of the Celestification system and the implementation methods therein as they pertain to a dynamic socio business networking system with multi-layered matrix mapping and gamified governance maintenance parameters according to system optimization and User preferences.

I. Celeste User Preferences

Celeste will integrate a Celestification User preference system, where the system operations will be altered to suit the User according to their preferences as they are indicated directly, indirectly, or inferred. Such that a User of Celeste will be able to personalize their own custom world across real, virtual, physical, and augmented reality dimensions according to their preferences in real time.

Direct: A User will directly interact with the system by way of the iconic language and/or visual indicia displayed in the genie filter system, the map, the mood gauge, the RYG light system, and the visually indicated zones, elements, and actionable features. Where a User can select one or more options, depending on the parameters of the visual indicia to satisfy a threshold of selection and thereby produce an actionable result.

Where the genie filter will populate iconic indicia communicating a variety of API portals that can be activated or inactivated by User interaction; the map will populate a variety of visual indicia that can be selected or otherwise interacted with by the User to produce an actionable result such as opening a portal, generating activity data, or connecting;

the mood gauge provides a variety of activity-generated polling questions based on User activity data and event detection, where the User will interact with the mood gauge to alter system elements such as theme, presets, connectivity, team strings, or otherwise interactive data manipulation indicators based on the Users mood at present;

the RYG light system will indicate directly to the system whether a User rejects, likes, or accepts any element applicable to User evaluation; visually indicated zones, elements, and actionable features will be populated in any applicable layers across real, virtual, and/or augmented realities where a User can interact with applicable visual indicia to activate, inactivate, stake, open, connect, tokenize reserve or other methods of actionable results based on the Users interaction. Further, Users can download influencers User preference settings, whereby their results will be modeled after the selected influencers User preferences. This is relevant to a User that may want to experience a location or dynamic event through the eyes of their favorite influencer, or for the savvy business entrepreneur whom would like to learn from the references of an experienced businessman, etc.

Indirect: A User will interact with the system indirectly based on their smart gamified governance profiles, geo location, patterns of use, pre-sets, purchases, activity data, and the like. Where a User will increase their access to system elements, features, promotions, networks, and the like based on indirect interaction through their (past) achievements, actions, patterns of Use, ratings, points, experience points (XP), integrated hardware, unlocked elements/locations, portal and feature settings including pre-sets.

Inferred: A User's interaction will be inferred based on their User history, smart profile, gamification metrics, social network comparables, or otherwise deduced methods of data collection, aggregation, processing, and conclusion based on understood User preferences. Where the User's preferences will be inferred to further enhance their experience through generation, leads, prompts, features, or gamification element activation. Where elements of AI, machine learning, neural networks, and deep learning will be used to develop a system innerstanding of predictable User behavior based on historic and inferred User behavior.

Real time adjustment allows for the User to adjust the system operations on demand within the boundaries of their User profile access level. Where a User will be able to completely alter their world view as they require, in real time, such that a Users map interface can take on different roles, functionalities, and views on-demand as the User interacts with the system, or at pre-set scheduled times.

For example, a User may have pre-set for when they are at work and when they are finished with their work day. These pre-set can incorporate more functional, educational, essential and productivity leveraging API's during the work day, and convert to more social, networking, and personal post completion of their workday; the User may also have a weekend pre-set if they do not work weekends, where they would have different API's and functionality pre-programmed. Further, this User may have a day off that is outside of the usual bounds of their pre-sets (ie. a random Tuesday) the User could then interact with the preferences system directly to indicate the world view that they would like for today, overriding their usual pre-set (e.g., workday).

This system ensures that the User will be able to control the functionality of the system in real time, based on their current User preferences. Where the preferential selection(s) is recorded, processed, and relayed to the system. Where the activation or deactivation of API portals and functionality settings can be adjusted to suit the User according to the User's indicated preferences. This is possible due to the layered map-matrix system, where the "map" is a visual display of the indicated preferences and the subsequent layer activation accordingly. Such that, a layer is a representative of a code/data packet, API, functionality, active feature; synced hardware, sensors, networks, etc. where the User can alter system functionality.

Further, the User preferences matrix is a visually indicative series of selections, displays, and results. Where the User can interact with or without hardware tethered GUI, insofar as the User is able to visually interact with the system and the results thereof. Where a User may be able to view the system as a projection, hologram, hallucination—beyond hardware such as mobile devices or any form of hardware capable of connection and visual GUI such as screens, glass, AR, VR, hologram, projection, visual augmentation or the like. Ensuring that the User is able to interact with the system without needing to be explicitly tethered to a mobile device and the screen vortex that existing systems rely so heavily on upon.

Rather, Celeste will connect Users to their environment without needing to rely on their mobile devices. Whereby, Celeste will be able to link Users to the system through wearables, augmentations, projections, datafication of assets, and trans-world connectivity. Though the system can still operate on a mobile device, tablet, or other hardware.

II. Celeste Hardware Compatibilities

Decision Making Technology (DMT) is a series of hardware designed to operate with Celestification protocols for real time activity data. Wherein the hardware devices can operate in tandem, in synchronicity, or individually within the Celeste system. The DMT will be a series of techniques designed to aid the User in real time, whether in the real world, augmented reality, or the virtual world.

Beartooth dongle: The Beartooth dongle may be incorporated to increase the User's connectivity and system functionality. Where the Beartooth dongle will be used to provide network service, an alternate power source, micro servers, micro data centers, power stations, where the User will be able to source energy from available sources such as zero point energy, body energy, electron pump, ether EMF, toroidal energy, etc. Moreover, the Beartooth dongle will be able to operate off-grid, through mesh networks and node matrices as the data will be secured, encrypted, zip compressed, for streamlined data transferability.

Further, Beartooth dongles may be used to communicate and process data pertaining to API keys and functional features, to the extent that the Beartooth dongle can communicate with the system towards training AI via machine learning, neural network, and deep learning protocols. Whereby, the AI system will be able to learn User states and preferences based on system interaction in real time or stored within the Beartooth dongle and/or node, allowing for the system to be able to perceive emotion, through engagement with real time adjustment (e.g., via User preferences, mood gauges, genie filter) moving ANI further towards AGI and ASI systems (Artificial Narrow Intelligence, Artificial General Intelligence, and Artificial Super Intelligence respectively). Where Beartooth dongles will further interact with sensor data as it relates to system matrices, operations, or adjustment which can further provide access to unsupervised data learning, resulting in Artificial Intelligence becoming less Artificial and more humanistic a true random functionality opens a dynamic realm of the realm of computational possibilities.

HISS: The Holes in Soles System (HISS) describes customizable footwear with a plurality of integrations and possible functions. HISS footwear will be integral to location data, beacons, and trail movement, where a User may be engaged in a trail or form or travel, either to produce or interact with either, the Users HISS will be able to confirm and verify their location and/or travel based real time live activity data metrics. Further, HISS can be used to design, interact with or augment the Celeste smart map or map layers, such that a User will apply their generated activity data to their interaction with the map where a trail, beacon, pin, ping, zone, or the like require verification of User location or movement. Further, HISS will affect the radii system, code zone system, or determine the User's interaction with any of the productivity or business networking features, APIs, and/or augmentations, to the extent of a digital avatar.

The HISS System interacts with smart axiom map layers by creating pathways and storing location data to map out zones, enhances production, increases security and safety, aids with the User's health and the like. The HISS is the smart footwear solution to a plurality of problems such as; hazardous work environments, activity performance tracking, high impact training, podiatry-connected meridian status, energy and toroidal circulation, security and safety, extreme environments, environmental conditions, difficult terrain, i.e don't step there, location mapping, travel competitions, verification systems, and the like.

Skowl: The eyes in the sky, integrating a two phase system, the first being the active component and the second, the relay and data collection system to establish overhead views, live streams, mapping data, live activity data, ping triangulation, beacon tracers, and the like.

Where by utilizing several aerial mobility components, satellite connectivity, solar, aerial imagery, li-dar, geographic layering, measurements, identification of any notable detection, and the like, the system can integrate large amounts of activity data directly into the Celeste System. Further systems integrated into the Skowl will include Governance from Above Tracking Systems (GAT Systems) whereby the Skowl will observe via the eye in the sky system (SkyView), as well as the location of all project-relevant static and dynamic components (Captains View). Where the User will be able to interact with these systems to access the live activity data, and data associated with the applicable systems according to the collection and operation of the Skowl.

Where additional functions can include SkyView data application, situational awareness, gameplan, and operations tracing, screen mirroring, HUD display integration, gamification governance control, and the gamified feedback therein such as visual indicia, belt level, meters, rewards, badges, access. Where augmentation development, adjustment, distribution, and/or utility will be applied through visually augmented, holographic, and/or projection display(s) of visual indicia such as iconic language, zones, probability, and/or any other data collection within the map displays, interconnective relay of data and/or system functionality amongst approved and interlaced components within the system. Where the data will be visually displayed on a screen, off screen, in 2D, 3D, 4D, by means of device, attachment, projection, and/or hologram, where a hologram will be projectable as a soft or hard hologram, such that the Skowl can project a physically tangible environment for User(s) to interact with. Where the hologram-reality can be applied to create Zones, augmented environments, or domes where Users can interact with each other, or the system, such that the interaction may include an augmented event, or series of events, actions, challenges, etc that can incorporate the development of holographic or otherwise augmented environments, assets, and operations. Where the User will be able to physically interact with augmented, projected, or holographic features capable of receiving sensor feedback, where the aforementioned may interact with touch-data.

Skowl can be controlled by integrated and synced hardware operated by a User with an approved and validated Belt Level. Live streams can be accessed, with augmentations visible dependent on the User's access level/belt level. Augmentations may be interacted with in either or all applicable realms.

Shot Caller: The operator's gameplan system, combining low-high tech dongle which will further incorporate a multiplicity of system technology and hardware integrations whereby the User will have access to any and/or all functions of the system even in extreme conditions.

The Shot Caller device can operate as a fully operational device, as an extreme device whereby a secondary screen can be operated to conserve battery. Further, the Shot Caller will be converted to be used as a location beacon, a network component, a communications device as well as establishing and manipulating events, pathways, travel, outings, gameplans, situation operations, and the like. Further, the Shot Caller has a plurality of settings, functions, modes, and the like to ensure that it is always ready for any environment, challenge, or lifestyle, even for the more extreme. Further, the Shot Caller can be used to project holographic GUI's for User interaction with the touch sensitive holographic elements, which could alternatively be displayed in heads up display, or otherwise augmented interactive visual displays.

The Shot Caller will incorporate projection, hologram, augmentation, HUD through device sync. Where a User may have the shot caller dongle, wristlet, ring, low-high tech phone augmentation, or head attachment to provide system support and operation functionality.

Dome Tech: Connecting Users to the system through Celeste Orbs and/or Celeste Bucky Balls according to the User's network demand. Where dome tech integrations can provide network connectivity through nodes strategically placed to provide the User(s) in zones, on trails, attending events, interacting with the environment or otherwise with system connectivity, where the User may require connectivity to interact with, by, or for the Celeste system. Such that, a User will come across a zone trip wire, or a radii, where the User will be prompted to check in, update, connect, or otherwise, where a base camp action is concerned (i.e., any action that will allow the User to ground their system version in order to tool up, update and revitalize their OS).

Celeste Orbs: link to an orb node to acquire information, instructions, directions, network connectivity, event themes or supporting data, hidden data packets, as well as linking to Wayvee off-grid communications and encrypted mesh networking.

Celeste Bucky Balls: are micro networks, where Users will be able to access extranet data, preserved with version control repositories that can be contained within encrypted zip data packets. Where a User will be able to update data online via Bucky Ball storage repositories, where an encryption key or other form of security wall may be required to access the contents.

AMP-A (AMP antennae): A mobile network of nodes to support Bluetooth connectivity and real time network relays. Where an AMP-A node indicates a User that has a particularly high ability to relay network signals and/or interact with Bluetooth connectivity. Allowing for said Users to be incorporated into the node map of networked signal repeaters. These Users will be incentivized to act as signal boosters, relay points, or Bluetooth assets.

III. Celeste Layers

I. Celeste Layers—API Integrations

API portals are customizable, based on User preferences, they are targeted to what the User indicates and leave out everything they don't. The windows of tech are too large and don't allow for User specificity, customization, or control.

Celeste is providing a wide variety of precise API rapidly programmable portals for Users to engage, and interact with according to their real time User preferences. The precision and focus of API portals allow for Users to modify their world view by way of modifying the technical functionality of the system through interacting with the User preferences matrix, as it pertains to the API portals, system elements, and functional features available to the User.

Celeste uses the axiom layering system to integrate a variety of features, functionalities, and operational portals such as APIs, based on User preferences, in real time. Where the User will activate any number of available system elements to adjust the system functionality to suit their current preferences. API integrations of Celeste are targeted towards Celeste User experience optimization, streamlining, business networking, international productivity and collaboration, connectivity, integrated purchases, gamification, augmentation, and the like, where the User will have a personalized system operation.

Integrated APIs can include the following systems among others operating in the frontend, middle, and/or the backend of the system.

I. Live Action Data

Celeste incorporates a variety of active data elements, where activities, challenges, happenings, and live data will be layered into the system operations through gamified governance. This can be through system generation, User interaction, hardware integration, sensor reception, and/or asset datafication. Where a User will engage one or more of the aforementioned elements, or similar, to produce a computer readable result, based on datafication, reception, processing, and databasing the element, including emotion. Where said data may be Used for machine learning, where the system will be able to collect information from the User based on their interaction that will be fed back into the system. Where collected and/or inferred data will contribute to future decisions in the system as they pertain to the User and their interaction. Where further, Beartooth dongles will be Used to provide micro data centers according to User interaction.

SkyView: An exclusive feature for Users to view live action data remotely. If a User has unlocked a location then they will be able to access the live streams and sky view oversight, where a User will be able to see what's happening, and who's here in a location they have unlocked, even if they are not currently at that location. SkyView allows the User to essentially zoom-out to the bird eye view, as in an open world game interface, where the User will be able to view and explore from afar, where Users will also be able to drop their avatar into the location to access the location data and view streams, etc. Further, Users will be able to interact with the virtual location through challenges, happenings, connections, activities, and the like, where Users may engage the map layers and interact with the location through their digital/virtual reality; their avatar.

Challenges: Celeste will incorporate a challenge matrix into the User's activity matrix, if activated, this will populate a variety of challenges generated by the system, by influencers, by other Users, or by backend/third parties to incentivize the Users engagement. Challenges can be populated within map layers, pushed between Users, included within game pathways, embedded within trails, promoted across the network, or locked in exclusive geo caches/data mines.

Where a challenge can yield User rewards based on their interaction with the challenge elements. Should a User come across a challenge zone, they will be prompted to interact with said challenge elements to earn gamified feedback rewards for challenge completion. Further, if a User encounters a challenge embedded within or associated with a trail, the User will be prompted to interact with the said challenge as an auxiliary element or necessary element to the completion of the current trail endeavor. Further, should a User discover a challenge hidden or locked, the User will have to unlock the challenge, which can require a form of challenge in itself or access parameter, once the challenge is unlocked, the User can then engage with the exclusive challenge which, upon completion, the User can be able to publish/ monetize/integrate into a trail as a public challenge.

The challenge matrix is elemental to the gamification system, where Users have proposed a variety of challenges, being tasks, to complete for incentives and rewards, which can further be applied to all areas of productivity and business networking, enhancement, skills and training, and any elemental function that can require an incentive for the User to complete a task, upgrade their profile or the like.

Challenges can be pushed in the digital, virtual, or augmented realities, as well as triggered in the real world with or without augmented interactive elements, where a User can be prompted to interact with a physical challenge, virtual challenge, or augmented challenge in real time through a digital portal, and/or real world reaction where the reaction can be verified through capture (video, image, stream), sensor and/or datafication.

Happenings: Integrated real time networking zones generated in the virtual or real world realms to engage User interaction with any of a theme, intention, network, objective or functional element, which may or may not include one or more API. Where Users can interact with the zone according to their User preferences and zone parameters, such that a User may be triggered or prompted to engage in a happening based on their location in the digital or real world, their network, their activated map layers, and/or API portals. Further, the happening can include a zone, a challenge, an action, and/or an event, where a User may be prompted to engage in a live game, live stream, networking event, activity, poll, or otherwise interactive gamified networking.

Happenings can integrate other system API's/active layers according to the happenings parameters, such as Waevee mesh networking, dome tech, challenges, live streams, User generated content, games, betting, or otherwise, where the User will be prompted to engage the happening such that the system, network or happenings element may be impacted and can produce a feedback result (loop) to the Users gamified smart profile. Where the smart profile can be augmented, or augment the system operations according to the live activity data and the system interaction therein.

Zones: Celeste zones are indicated based on parameters set by the zone creator, this may be applicable to the digital display, virtual realm, or in the real world—where a physical zone is digitally established based on spacial parameters set within the virtual world, for Users to engage in the real world. Where the node maps will indicate the parameters of the zone—based on the settings of the zone, a particular number and orientation of nodes will be green lit for operation leaving a yellow buffer zone to establish the perimeter and a red zone for exclusion.

Green Zones are the active area of the zone, within these boundaries the zone events will occur. Where an event is any actionable element such as challenges, networks, activities, games, happenings, and the like. Should this zone be transferred to the physical world, the zone will be covered by a form of network connection such as WiMAX, dome tech, or relays.

Yellow Zones are the buffer zone, where Users will be notified of zone boundaries in either entering or exiting the parameters of the zone. In a physical zone, this can be viewed as a trip wire; for Users moving near a zone, upon reaching a yellow boundary, they will be notified of a zones existence (should they satisfy the system qualifications for User interaction with the said zone (e.g., they have the applicable layer(s) activated, they have the appropriate access/belt level, etc. . . . ). Likewise, once in the (green) zone, should the User make contact with the yellow boundary they will be notified that they are leaving the said zone.

Red Zones are the inactive area around a zone, or effectively the standard operation zone (where non-zone events occur at all other times).

Zones will be considered public, exclusive, or hidden. And each of the zone varieties will be interacted with differently according to the User's system parameters (e.g., preferences and access).

Public Zones are displayed, and may even be promoted in the system display, should the User have the appropriate layers activated to see such elements within their world view. e.g., If a zone is targeted to a public pick up basketball game, where Users can play, spectate and place bets on the game in a "15 hr basketball zone" the User may only see this information should they have layers that pertain to sports, activities, entertainment, parks, or group events turned on.

Exclusive Zones are only populated for Users that satisfy the necessary qualifications to be included in the said zone such as belt level, pathway, team network, or the like. e.g., If a zone is targeted to tech entrepreneurs "byte, bots and business", only Users that have indicated an interest in tech and business entrepreneurship are likely to be notified of said zone, and in this case, only Users with a belt level above orange and at least two team connections will be notified to ensure that the zone remains on a certain level.

Hyper-exclusive zones may further require that the User be a part of an X-Club in order to gain entry.

Hidden Zones are secrets to be discovered within the system, in virtual or real world environments, where a user may come across a happening zone, challenge zone, or the like during their interaction with the digital and/or real world node matrix. Hidden zones can be found in trails, or simply attached to one or more nodes and the User would have to discover the zone through exploration and interaction. e.g., a User is walking in a city and discovers a geocache of data describing a historical event that occurred in this location, by discovering and unlocking this zone the User has the opportunity to engage with the zone and interact with the gamified trail to learn more, If this is the first User to discover said zone, then they will be able to publish the trail and potentially monetize it for themselves based on other User engagement.

For clarity, a zone can also be independent of the real world and physical locations, so long as there are set parameters for User interaction and a theme or objective of said interaction applied to a space in time. e.g., a user is interacting with Celeste from their home, their avatar is moving through a node map and discovers a group of Users logged into a virtual space, upon reaching the yellow zone of this space the user is notified that this is a social zone where Users are watching a live stream and push a notification to the User to determine whether they would like to enter the zone "Smooth Jazz and Chill". If the User says yes, they will be moved into the green zone and therefore able to interact with the other avatars and zone elements therein.

Zone functionality can be enhanced with system network magnifiers such as network/service providers to connect everyone within the designated zone. This can be accomplished by using hardware devices that can power ISP, Ether Boxes, C-Orbs, C-Bucky Balls, or networks using AMP-A repeaters.

Celeste Streams: An interactive streaming platform. Whereby, viewers will not be relegated to simply watching content, or leaving comments. Rather, Celeste Streams will allow Users to interact with each other, stream providers, third party actions, and the backend system with streamlined actionable elements layered over the stream in real time turning analog reality into a database able object, class, instance oriented dynamic search engine.

Where an action is considered an element populated that may require a form of participation on the part of the User that will determine the Users position through their act; resulting in any, or all of altering their smart profile based on progressive aggregate data of User history, altering the action in a way such that the action was intended, and/or an element that can affect the stream in such a way that the action was intended. Thereby, altering the stream in either a passive or direct manner depending on the intent of the action that was pushed and acted upon by one or more viewers. Moreover, potentially altering the User's profile based on their preferences or decisions indicated by their actions.

Effectively, bringing streaming into the viewer's world, and the viewers into the stream; merging digital content with real world connection through integrated trans-dimension actionable content. As, the Celeste Streams system would have a vast array of applications across several industries, bringing live streaming into partitioned realms for effective User interaction. This would allow for a wide variety of stream providers, and interconnected linking of actionable elements.

Elements of the Celeste Streams system would allow for stream providers or system operations to push interactive elements (actions) out to any User capable of reception; this could apply to Users that are currently viewing the stream, Users with their stream pings set to on, and/or Users within the applicable radii. Such that; If a User is actively viewing a stream then they will be prompted towards the actionable element; If a User is an avid viewer, not currently viewing, but has ping notifications turned on, then the User will be alerted to an actionable element relevant to their ping specifications; If a User is within a radii either by physical location or digital connection then they can then be informed of actionable elements relevant to their personalization specifications.

Moreover, User interaction can be custom tailored to the User. Whereby, a

User can specifically adjust their preferences in the iconic filtering system in their profile; indicating the content and specifications of their User preferences when considering their User experience. Else, the User's known data will be considered based on their previous use and predictable actions. Thereby, producing a personalized User matrix without the need for extensive filtering or searching on the User's behalf; providing content tailored to their interests and thus their own personal network for their specific interests; both indicated and inferred.

These networks or microcosms of personal interaction provide the system with relevant networking data to further customize the system based on User networks and interaction as it relates to actionable interests and programmable predictability/machine learning.

Therefore, with smart profile adjustment; the system will be able to segment the content and minimize any potential delay as it relates to stream delivery or actionable content. The backend User matrix will optimize the User experience and system operations with predictable programming and personalized filtration of content, actions, and networks. Creating virtual microcosms of each Users preferences of interaction. And populating a gamified iconic User experience based on interactive visual indicia.

Applications that may be considered viable for interactive streaming on Celeste Stream would be integrated through real time channels promoting the interconnectivity of tethered networking to live streams. Else, the User would be able to interact with elements of streams that are no longer live, as actionable content that is not restricted by time parameters may still populate for actions that do not have a limit on interaction time or otherwise. Therefore, a user can interact, or experience lives streams and/or streams that are no longer live, thus creating a simulation.

For example; a premier unveiling of an automotive company's latest model is streamed live, this event is scheduled for a set time of 13:20 and said to run for 1 hour and 10 minutes. During this time, live viewers that check-in to the live stream is able to see the primary unveil, they are given a tour of the product and the company representative is scheduled to speak for the last 15 minutes. Throughout this, the viewers will be able to interact with the stream through live voting, ratings, and communication around their personal opinions on the first look at this product, they could also use an AR filter to adjust the color; their action(s) will be recorded in data and populated visually on the platform and the company representative may even interact with their comments or voting data directly during his speech. As a bonus for checking-in to the live event, Users who watched and interacted live are entered into a lottery and one of the live viewers will be chosen for an early model giveaway of the product. Now, a viewer that watches after the live stream is no longer live (post 14:30) then that User will be able to interact with the voting, opinion, and AR actions, though they will not be entered into the time sensitive lottery.

In both live and post-live streams, the data collected from actionable content will continue to populate in real time; meaning that the actions will continue beyond the live debut of the stream, allowing for perpetual data aggregation. This applies to all actions aside from those with restrictions; such that they were tied to an element of the live stream specifically, such as the time restriction. Though, it could also be affected by a location restriction, level restriction, special keys, or the like.

Actionable content will be considered differently depending on the application of the stream. As, Celeste Streams will be able to integrate into a multitude of industries spanning business, entertainment, and personal. Though in essence, any actionable element can be considered a prompt for participation on the part of the Users in such a way that the sender may collect or interact with the receiver.

Senders can be at least one of (1) the stream content creators, (2) a stream sponsor, (3) the operating system, (4) authorized Users.

Receivers can be any of (1) a User viewing the stream live, (2) a User viewing the stream post-live, (3) a verification bot, (4) a User being prompted to join the live stream through a push notification ping of actionable content.

Actionable Arenas are without limitation though can include any of (1)
Entertainment—Debates, (2) Entertainment—Social, (3) Entertainment—Challenge, (4) Entertainment—Production, (5) Entertainment—Strategy, (6)
Training and Apprenticeships, (7) Education and Development, (8)
Business, (9) Meetings, Conferences and Think Tanks, (10) Beauty and
Fashion, (11) Competition, (12) Athletics—Personal, (13) Athletics—Professional, (14) Purchase and Shopping, (15) Auctions, (16)
Management, etc. The actionable arenas are considered without limit as they represent the areas of life that we participate in.

Therefore, the formula to determine actionable arenas is effectively evaluating the level of action and interaction that each event can present when streamed over any applicable device to a User that may or may not be viewing live, though expecting regardless to interact with the feed in a real time manner as it relates to the content populating the stream. Thus, the proposal the system is charged with is to populate each arena with content that engages the User personally.

This method can be viewed as a series of push sequences, generated specific to the content, User, or realm, capable of engaging the User in the content in a personal and interconnected manner. Either to the content directly or to a third party, other Users, or the network as a whole.

Whereby, the system will allow for content to layer upon the stream in real time with the stream progression as an on-demand element, automatic element or User propelled element. Giving the stream a multi layered dimensionality of engagement.

Layerable elements that could be used include functions that provide or collect data in the form of User generated data based on their response (or lack thereof) to actionable elements in an Arena. Where an arena is simply a zone that can contain any of, a stream, a viewer, and an actionable element.

Potential elements can include any of (1) votes, polls, and surveys, (2) pathways, (3) Purchasing, (4) Betting, (5) Bidding, (6) AR elements, (7) Icebreakers, games, and social engagement elements, (8) Puzzles, (9) Skill Verification, (10) Upload, (11) Trails, (12) Communication, (13) Evaluation, (14) Interactive Graphics, Charts or Visual Elements, etc. The actionable elements are considered any component that can be layered onto a stream to increase viewer engagement between real and virtual worlds through augmented gamification.

Whereby actionable elements can be acted upon such that the User would be able to engage with the stream, media, event, creator, network, or system in such a way that the User experience may be better optimized to yield a more personal microcosm of their custom world.

Proposed in this system is a platform capable of effectively merging real worlds with virtual worlds, and/or real worlds with real worlds through a virtual world portal. Through which Users will be able to actively engage in a multitude of environments in real time, of direct consequence; without actually physically needing to be present. Thereby, connecting Users to a myriad of worlds in multiple realms through the connectivity of Celeste Streams hosting of Actionable Arenas that may provide Users access to interact in industries, events, or lifestyles.

The system is composed of a computer-based method of operation for the backend and frontend systems including a processing unit and database, a connection between devices that will allow for the transfer of data in real time, an action-triggered ping system of prompts, a smart filtering system for the personalization of the User experience based on direct or indirect system adjustment, a series of sensor-based elements to merge virtual and real worlds that can also lend itself to AR operability, push feedback loops, aggregate data layering over visual media streams, augmented gamification of visual media forms, smart profile gamification with iconic language and level systems, backend filtering optimization among others.

II. Points Management

Celeste will have an array of commerce and financial portals to suit the User based on their preferences, encrypted and secured on the blockchain with trustless consensus. Where a User can use their joux points to interact with a variety of portals which may then interact with other portals.

Joux: A points metric system that allows users to purchase, exchange, and sell, as a trustless decentralized ledger backed by proof of work, proof of space and time, proof of object, and/or proof of protocol. Where Joux can be earned, assets tokenized, rewarded, or bought. Joux balance is recorded in the User's profile and may be accessed within APIs or used as a medium for purchasing, exchange, or pledge. Joux has a relative value to other currencies and can be exchanged for said currencies within a currency basket exchange system, logged on the blockchain with trustless consensus smart contracts. Further, Joux can be placed in cold storage or an encrypted key. Joux uses proof of work productivity smart contract systems to mine for work productivity and actionable results.

Numera: Numera is a financial network and exchange platform. Where Users can stake, exchange and move assets based on a basket currency system. Where Users may hold a variety of valued currencies including hard assets, digital currencies, standard fiat currencies, stocks, etc. Where Users will be able to exchange assets across multiple platforms with ease using the joux points system to purchase and sell assets within the User's designated basket. Where a User can have a basket of currencies considered of highest value (to the User or the system based on user preferences or evaluation protocols respectively) that can be leveraged to purchase, sell, trade, stake or put. Where Users can interact with any of the Celeste integrated APIs, features, and/or system operations that may require the use of joux points, moreover, the User would have the ability to convert their earned joux points into a stake in any of the Users basket options. Thereby allowing the User to earn joux points through gamified achievements and convert their joux into the ability to complete in-app purchases, or stake into any of their basket options, or place a put in Numera Bets, or use within any applicable Celeste API (e.g., co-op), etc.

Numera is secured with blockchain technology, trustless consensus protocols, smart contracts, and chaos encryption with version control protocols and User loc-step security chain protocols, where the User's preferences indicate their security preferences.

Further, Numera will also have a bet integration, which will allow Users to stake a set amount of currency on a real time bet, where the bet can be any scenario or situation that may produce one or more outcomes that could yield a profit should the User stake well. This may be amongst Users within a Numera group or based on real time events detectable by the system. Further, the Numera Bet system will allow for Users to gamify any situation with more than one potential outcome such that a user can create a single bet, recurring bet, or a tournament, where Users may place a put according to their selected potential outcome, where the winner(s) will collect once the result is determined. Should there be an anomaly, and none of the potential options became the result, each User will retain their original put with no User gaining or losing any points.

Users can engage with three tiers of betting by placing (put) their points in any of a Single Bet (on the spot bet pushed to public or private groups with a minimum time to engage), Recurring Bet (bets that occur at regular intervals or otherwise known times, pushed to public or private groups with a minimum time to engage, though may be placed in advance, pertaining to the same bet category/qualifiers), Tournament (large network bets that can be public or private, can be of the same qualifiers or of different categories and are likely to produce a variety of potential results across more than one category and/or qualifier—where a category pertains to the type of bet activity and a qualifier indicates the bet parameters which may include the level/access of Users intending to place their put).

Purchase: An integrated smart shopping API that allows users to augment their shopping experience with integrated gamified elements, smart basket, and influencer gift systems. Where Users can 'download' smart baskets based on an image, advertisement, theme, package, or the like, such that a User can indicate any of the aforementioned, and the smart basket will find the items for purchase, composing a basket of elements from the indicated source. Further, the User can be able to view live streams of items, where the User may be able to interact with the product, and/or the influencer that may be modeling or testing the product, which may further be expanded to product launches or major developments.

Users can also create influencer gift sets, where they will have baskets specifically for other people to purchase for them as gifts, ensuring that when someone would like to buy a gift for someone, they will find the right product(s) and the right specifications (e.g., size, color, etc). This feature can be embedded on Users' social media profile(s) such that they can promote their purchase influencer gift basket(s) for others to gift them, or contribute to (not purchasing the entire basket).

Further, this can be extended to projects and developments where purchasing materials would be required.

co-op: Networked project funding and management system for communities, groups, and businesses, where a co-op may be made up of two or more Users that pay in at regular intervals, with the exception of one interval per contributor, designated as the (each) User's payout time. On their payout time, the User will receive the cumulative total of the pay-in for that interval by all other contributors who accept the indicated payee for that interval. The payout intervals are determined/assigned by a lottery at the onset of the co-op cycle, designating one contributor per interval to receive the full payout instead of paying in. This allows for communities, private groups, startups, and businesses to generate funding for projects/progress, in the case of higher value business networks, larger capital can be circulated through a co-op without requiring a third party system. Co-op allows for projects to source funding, or even multiple projects to be self funded in a collaborative manner of financial exchange and funding initiatives.

III. The Business Network

Celeste will promote and facilitate business networking amongst Users, where Users can be incentivized to connect, network, collaborate, hire or contract with others based on business objectives or other productivity enhancement features. Moreover, where influencers can push data packets of their version (control); User preferences or interaction interface, trail(s), or experience(s), such that it may lend itself to the promotion of business and productivity oriented networking throughout the system.

CoNex: Integrating systems to facilitate essential business travel, networking, and workcations. Where Users can access exclusive networking locations in virtual rendezvous hubs or physical locations, such that a User will be able to actively engage in business and productivity based networking opportunities based on their access level (belt/smart profile). Further, Users will be able to connect their productivity score and skill set to determine their potential eligibility to participate in a workcation. CoNex enables Users to connect and network around business and productivity, travel, training, and work, based on their User smart profiles, User access/belt level, and User preferences, where Users will be able to interact with the CoNex networking system in virtual reality with their avatar, augmented reality or the physical real world.

Workadore networked productivity hubs will be accessible to Users with suitable validators. Workadore locations will be themed for specific interests and functionalities. They will be physical locations or virtual locations, and verified businesses can become workadore hubs in the network.

The Perfect Butler System: Celeste will promote a personalization matrix within the system to enable users to customize their User experience through interacting with the visual indicia/iconic language to determine their User preferences. The Perfect Butler AI System ensures that the User will have access to all of the comforts and amenities whilst traveling, ready on arrival and on-demand. Where the User's preferences may indicate the services that they would like once they have arrived at their intended destination. Such that, a User can indicate directly through an iconic filtering system (e.g., genie filter, mood gauge, DNA rating scanning system) or respond to system notifications based on an inferred understanding of the User likely preferences based on past interaction/machine learning. Where a User will have all of the services and amenities they desire ready on arrival, on-demand, and tailored to the User throughout their travel, or even without the necessity of travel; Users will be able to activate The Perfect Butler System and thereby trigger the smart services matrix to suit their User preferences.

On-demand services can be hired individually or through team matrices, where the user can select one or more services based on their User preferences, example API's will connect service providers from systems such as:

ArmCandy can provide access to a variety of Virtual Assistants and Personal Assistants, on-demand, with a wide variety of skills and industry specialization (s) as well as personal cooks, maid service, home caretakers, etc.. where Users will be able to interact with ArmCandy and plan outings in the ArmCandy gameplan to attend events, explore, learn, engage, or otherwise as it pertains to gamified networking.

VEDI (Voyages Experiences Destinations International) can provide access to a variety of on-demand security and transport packages of one or more service providers including stationary, mobile, and ambulatory security, as well as motorcades, private transport, up armoured vehicles, copters, planes, jets, boats, submarines, yachts, hovercraft, airships and the like. Further, providing access to international essential business travel assistance to connect Users to a variety of transport, experiences, activities and tours, security, guides, and otherwise essential elements of travel. VEDI will incorporate all forms of land, sea, and air travel available to the user on-demand. Further, the User will also be able to access services such as security, guides, drivers, interpreters, and the like on demand.

A rider can provide the on-demand delivery of products to the User personally or to their destination ahead of time, pre-delivery of the products will ensure that the User has what they indicated upon arrival.

The rider can also provide personal shoppers and people to set up basics such as a phone chip for an international traveler upon arrival.

Business Essentialization: Celeste will assist in promoting businesses and integrating businesses into the system through a process of business essentialization. Whereby, businesses will be datafied to enable physical and digital businesses to become included in augmented business networking systems. Where the augmentation of datafied businesses can then be interacted with by Users through gamified governance matrices, such that the business will be able to operate through Celeste portals and respond in real time to physical and digital interaction. This will ensure that businesses may evolve to suit the new world demands for essentiality. Where businesses may suit User demands through technology-enhanced operations, where Users can interact with businesses and their products or services in a real time and gamified manner. Further, businesses will be identified through visual indicia such as iconic language or color codes, where businesses may indicate their industry, services, or accessibility through visual indicia for ease of search via smart networking displayed visually.

Gamified forms of advertising will be possible with the Celeste business essentialization system, where augmented businesses will be able to advertise within trails, zones, events, streams, influencer campaigns, augmented/virtual shopping, and API. Such that a user can interact with the system and may be prompted towards a business based on gamified advertising that is suited to the User based on their known preferences. These ADs can be augmented, pop-ups, gamified interactive elements, microgames, sponsorships, influencer streams, iconic language/visual indicia, and the like.

Further, Users will be able to modify the business database based on their own version control protocols, where User preferences can determine the version control, branching, and therefore the visible data. Further, Users will be able to download copies of influencers User preferences as it relates to their feed, or the system can generate a feed based on User interaction/machine learning.

IV. The Productivity Network

Celeste will incorporate the Productivity Network (PN) which will primarily be Used to manage all teams, tasks, projects, and objectives with remote viewing, progress management, verification systems, and live streaming capabilities among others. The PN will incorporate real time monitoring of any productivity-oriented task, system, or team where the User may have a vested interest in viewing said data. The data will be streamed live with augmented verifications, communications, indicators, and notifications, further, it will also be storable, where a User will be able to view the data at a later time.

Celeste Service Engine: Digital agency with codified profiles, such that the skills and accomplishments are paramount to all other data, where backend systems will be able to sort and evaluate profiles and push them accordingly with coded/binary identifiers. Further, Celeste Service Engine will use games, challenges, puzzles, and other gamification techniques to test, evaluate and interview potential Celeste service providers, where applicants will be evaluated and graded based on their interaction with the gamification system. The essentialization of skilled service providers can be verified through a digital hiring agency such as Celeste Service Engine where skilled service providers are verified and datafied with smart contracts that may be logged on a blockchain ledger.

LionCloud: Incorporating a remote management system with augmented live streaming and verification systems. LionCloud will allow Users to view their projects, properties, or investments from anywhere through live streaming or record. Where Users can have access to progress meters, video, and photo verification relating to projects, developments, or logistics relevant to the User. Further, Users acting as project managers, overseers, owners, or investors will be able to view the project/property progress in real time with live streams, remote viewing, bots, and hardware assisted augmentations, insofar as the ability to maneuver an avatar to discover project progress and communicate with team members, where the avatar may or may not be linked to hardware such as a bot or drone.

Celeste Symphony: Promotes productivity via a series of productivity platforms, focussed on various avenues of productivity systems capable of connecting investors, project developers, visionaries, contractors, skilled laborers, apprentice laborers, administration/HR, specialists, consultants, lawyers, etc. to develop small and large projects from inception to completion. Celeste Symphony will be able to provide real time monitoring with remote access, all based on the User's belt level, where a project investor will have different access than a team leader, or a skilled laborer, etc. Celeste Symphony will use augmented systems to train, perform, manage, monitor, and otherwise indicate parameters for progress and completion of tasks, milestones, and objectives as they relate to the overall mission/development/ project, such that visual indicia can be used to guide the User in training, performance, communication, etc. Further, gamified governance includes funding, payment, rewards, and feedback; where Users can gain experience points, upgrade their level, earn new badges and skills through real world productivity augmented with gamified governance, connecting with applicable hardware and software systems.

II. Celeste Layers—Profile Parameters

Celeste layers can be further determined by the Users profile, User history, and system interaction based on past use, patterns of use, and logged User data. Whereby the User can alter their system based on their profile metrics and personal activity data. Gamification of the User's profile, their interaction, and the gamified governance thereof can determine layer elements, event nodes, and activity functionality based on the User's profile parameters. Where profile parameters may change over time based on system operations and User achievement feedback loops.

Gamified Governance: User profiles in Celeste will be enhanced with gamification, and managed through gamified governance features. Whereby a User may be directed within the system to interact in a manner that is most suited to their backend profile through incentivization and game pathways.

Users will be rewarded for their interaction, and incentivized to interact, this can include guided incentivization matrices, where a game path can encourage a User to achieve certain tasks according to their incentivization matrix.

Gamification features are any generated event that would entice the user to interact with the system based on rewards feedback systems. Gamified governance uses these features to direct, manage and encourage the User to participate in game paths according to the system parameters, objectives, and User preferences. Gamification of a Celeste Users profile can include the incorporation of elements such as ratings, levels, achievement badges, objectives/missions, experience points (XP), achievement rewards, unlocking rewards, joux points, and the like. These features can be applied to User mission objectives, game paths, network connections, points, and increased element availability through earning the ability to unlock features, portals, keys, services, views, hardware integrations, games, connections, and the like.

Where gamification brings the User into the virtual world, and gamified governance pushes the games out to the real world, Celeste is using gamification systems and protocols to enhance the Users experience and in doing so increase User engagement and real time interaction.

Leveling Up: Celeste Users will be graded, at least in part, on a belt level system, where users will be incentivized to increase their belt level. Gamification elements will feedback into the belt level system, where users will be rewarded based on their system interaction/accomplishments.

A great number of belts are possible, tiered in succession based on an increasing value weighted within the system; based on metrics as they relate to the operation of the system. Whereby, the difficulty to achieve the threshold of completion to transition to the following belt in the series increases according to the belt level parameters. Such that a User may be required to complete a series of tasks and/or satisfy set parameters so that they will graduate from their current belt level to the next in the series.

Moving up in belt levels is incentivized within the system through feedback rewards mechanisms such as increased access, more features, greater points matrix, more network opportunities, Teams: Formation of productivity, social or business teams with other Users that may be a part of one or more of your networks, or can be a service team member, and therefore is integrated into your team network that pertains to service providers within your networking matrix. Where Users will be able to link teams to their smart profile, such that a team may be able to participate, communicate, collaborate and/or compete. Where Users can use these teams to network and connect internationally, including sharing and creating data.

Further, Users can have service teams available to them, where teams and networks of service providers the user has previously engaged with, or system generated suggestions based on user preferences and past use can populate within a designated team network associated with the User. This allows for streamlined access to familiar and suggested service providers, saving the User time when traveling or working.

Further, teams can be used to engage in competitions, challenges, and activities. Where team members may be associated based on a common goal or interest, such that the team members may be required to work together or against each other to satisfy a team objective, which further may include a betting feature, gamified points matrix, or other gamification feedback systems.

Further, teams can generate associations that may incorporate financial structures, data sharing, project development, competition, cooperation, or any other form of team-oriented connection. A team can be incorporated into the Users API matrix, and/or the Users API(s) can be incorporated into the Users team matrix. Such that, a User will be able to engage with team members, view their data, or otherwise track, trace or interact with them based on gamified governance matrices.

III. Celeste Layers—System Operation

The Celeste system takes the overall effect of integrating multiple API portals and elemental features to augment the system functionality based on User preferences in real time. Where a User can alter the system operation based on their User interaction, activation/deactivation of map layers, and engagement in visual indicia and/or the virtual, digital, augmented, and real world elements that may trigger an event based on the detection and response of an event listener to yield a dynamic and interactive personalized experience-centric life enhancement business networking system.

LiSTN: An intricate series of event listeners, and even moderators that trigger response loops based on User interaction and potential trigger factors. Where the system can incorporate the functionality of LiSTN to maintain real time worldwide dynamic responsiveness across the digital and real world dimensions. As well as maintaining a key role to ensure augmentation is projected and received in real time, that the interactive responsiveness is detected and processed in real time, and that the User is pushed the following action series according to the prior interaction in real time. Thereby allowing the system augmentative responsiveness to be seamless and the actions thereafter to yield real time streamlined system action. LiSTN can also be used for command control and trigger operations where applicable.

Gamified Governance: An overarching engagement system that incentivizes the user to interact with the many facets of the system to gain rewards, whilst providing the system with real time datafication of User psychology, based on User interaction and User preferences. Whereby, the system may learn emotional and psychological responsiveness based on the constant User preference data feed. Gamified Governance allows for the system to objectify intentions and streamline pathways with incentives that provide the User with functional game elements such as rewards feedback loops, terrain manipulation, storylines (pathways, missions, trails), geocache data packets, etc Rewards LOOP: Providing Users with gamified profiles that will incorporate feedback loops to adjust their gamification elements in real time. Where User's ratings, joux/points, experience points, badges, titles, level, and access keys can be adjusted according to their successes and/or failures during their system interaction. Where governors will be placed on the User depending on their gamification metrics, adjusting their access to new tools, portals, locations, elements, and layers (where layers determine the system's overall functionality).

Terrain Manipulation: Allowing Users to adjust their world view based on their User preferences in real time, where Users can layer the system operations in such a way that the environment reflects the User preferences visually and in functionality. Where the terrain is constructed into a visual representation of layered node matrices and the functional elements therein. Users can also zoom out and drop into other locations that they have unlocked using the SkyView feature, where the User will be able to view the Live Activity Data in the selected locations, where Users can also use an avatar to interact with the selected unlocked location (explore, challenges streams, etc).

Storyline: Creating trails, pathways, and missions for Users to follow and interact with. Where a User can follow their own system-generated storyline based on User interaction/indication/preferences, or a content creator's storyline such as a trail, pathway, or mission published by an influencer, trailblazer, or project developer. Storylines can be macrocosms of tasks and challenges, which will be pushed as featured challenges or tests, or storylines can be overarching character development for the User where they may increase their skills, complete tasks, and compete for resources based on their interaction with their personal storyline. In either case, the User, system, or other Users may place bets for, or against the User's ability to achieve any selected storyline (even something as simple as losing 10 kg this month), where Users may place bets based on the active storyline(s).

FireCloud: Providing Users with a base camp where they can access data caches, such that Users can download, upload or otherwise update their data, tool up, kit up, modify version control, exchange or trade their assets, log new skills or otherwise update the hard copy of the User's profile/map-matrix, their access or how they view the system when operating offline. FireCloud creates a gameplan matrix, for Users to rewrite their playbook for offline operations, where they will be able to access what they want and operate as they need, even when offline. Where Users will be able to push data packets, and/or discover data packets. Where data packets are indicative of pre-sets, logged User matrices, or otherwise composed of data indicative of a Users experience, stored in FireCloud for future access with either private or public keys depending on the access/privacy settings indicated.

Domes (Dome Tech): Tech integrations that will provide access to data, networks/connectivity, events, actions, or the like. Where Users can engage a C-Orb, C-Buckyball, or AMP-A repeater to achieve any of the aforementioned system operations. Such that a User will either enter the sphere of a dome (e.g., a zone with a C-Orb dome), where the Users experience will become augmented by the functionality of the C-Orb, such that new networks, connections, other Users, challenges, activities, etc can be pushed to the User for their potential interaction within the dome, or the User can activate a dome tech through selective action, where a User will intentionally engage an available dome tech element to augment their gamified experience, such that the user may participate in activities, or otherwise interact with data therein. Where a User could participate in a gamified experience, with feedback loops, point matrices, and governance systems, within a select dome, such that the User would be in an augmented game radii facilitated by dome tech which can be integrated with hardware elements, network connectivity, streaming, etc. where a dome game may have parameters to the physical location (e.g., radii) and/or the virtual location (e.g., interaction). Further, where a dome game can have a script or series of event nodes/listeners with trigger wires based on threshold responsiveness. Where domes may be further enhanced or extended should a User engage one or more AMP-A repeaters.

These basic elements, among others, contribute to the gamification, moreover, the gamified governance of the industry and everything that it touches, be it the gaming industry, tourism, content sharing, streaming, browsing, data storage, business networking, fintech, productivity networking, and processing, etc.

The Celestification system creates a dynamic trans-world environment that spans over digital and real world realms with interactive gamified system features. The system integrates a diverse array of detection and response systems to feed into time feedback loops that determine User interaction and rewards matrices. Where a User is able to create, modify and exist in their own custom world spanning over digital and real world environments, connecting with digital and real world people, places, and things. These actions can be detected and projected into an interactive augmented real world simulation, where each user is in control of their own reality. This system allows for these interactive experiences to occur because of the extensive streamlining and the key integral features that ensure that each Users impact on server host load, networking, data usage, and system requirements is lessened to facilitate efficient operations in real time with minimal energy and data usage. Thus, allowing for extensive real time functionality without the burden on the system through compartmentalization and customization of system application operations.

Although the present disclosure has been explained in relation to its preferred embodiment, it is to be understood that many other possible modifications and variations can be made without departing from the spirit and scope of the disclosure.

What is claimed is:

1. A computer implemented method for facilitating modifying environments based on user preferences, the computer implemented method comprising:

receiving, using a communication device, at least one interaction data of at least one interaction of a user in relation to at least one experiential environment of a plurality of experiential environments from at least one user device;

analyzing, using a processing device, the at least one interaction data;

determining, using the processing device, a plurality of user preferences associated with the user based on the analyzing of the at least one interaction data;

provisioning, using the processing device, a plurality of content corresponding to the plurality of experiential environments based on the plurality of user preferences;

storing, using a storage device, the at least one interaction data and the plurality of user preferences;

determining, using the processing device, at least one imagery adjustment for a framework of perception of the plurality of experiential environments based on the determining of the plurality of user preferences;

wherein the provisioning of the plurality of content corresponding to the plurality of experiential environments comprises modifying the plurality of content corresponding to the plurality of experiential environments based on the at least one imagery adjustment;

receiving, using the communication device, at least one environmental sensor data from at least one environmental sensor comprising at least one of a temperature sensor, a humidity sensor, and a pressure sensor, wherein the at least one environmental sensor is configured for generating the at least one environmental sensor data based on capturing at least one environment characteristic of an environment associated with the user;

analyzing, using the processing device, the at least one environmental sensor data, wherein the determining of the plurality of user preferences is further based on the analyzing of the at least one environmental sensor data;

receiving, using the communication device, at least one condition associated with the at least one interaction from the at least one user device, wherein the at least one condition is based on one or more contextual variables comprising at least one of an identity of a user and the at least one environmental data; and analyzing, using the processing device, the at least one condition, wherein the determining of the plurality of user preferences is further based on the analyzing of the at least one condition.

2. The computer implemented method of claim 1, wherein the at least one interaction data comprises a plurality of direct indications of the plurality of user preferences of the user, wherein the analyzing of the at least one interaction data comprises identifying the plurality of direct indications of the plurality of user preferences, wherein the determining of the plurality of user preferences is further based on the identifying.

3. The computer implemented method of claim 1, wherein the at least one interaction data comprises at least one historical interaction data, wherein the at least one historical interaction data comprises at least one historical interaction of the user in relation to the at least one experiential environment, wherein the analyzing of the at least one interaction data comprises analyzing the at least one historical interaction data, wherein the determining of the plurality of user preferences is further based on the analyzing of the at least one historical interaction data.

4. The computer implemented method of claim 1, wherein the at least one user device comprises at least one interaction detecting sensor, wherein the at least one interaction detecting sensor is configured for generating the at least one interaction data based on capturing the at least one interaction of the user.

5. The computer implemented method of claim 1 further comprising:

receiving, using the communication device, at least one activity data of at least one activity of the user from at least one activity detector device, wherein the at least one activity detector device is configured for generating the at least one activity data based on detecting an activity of the user in relation to the at least one experiential environment; and analyzing, using the processing device, the at least one activity data, wherein the determining of the plurality of user preferences is further based on the analyzing of the at least one activity data.

6. A system for facilitating modifying environments based on user preferences, the system comprising:

a communication device configured for:

receiving at least one interaction data of at least one interaction of a user in relation to at least one experiential environment of a plurality of experiential environments from at least one user device;

receiving at least one environmental sensor data from at least one environmental sensor comprising at least one of a temperature sensor, a humidity sensor, and a pressure sensor, wherein the at least one environmental sensor is configured for generating the at least one environmental sensor data based on capturing at least one environment characteristic of an environment associated with the user;

receiving at least one condition associated with the at least one interaction from the at least one user device; wherein the at least one condition is based on one or more contextual variable comprising at least one of an identity of a user and the at least one environmental data; and a processing device communicatively coupled with the communication device, wherein the processing device is configured for:

analyzing the at least one interaction data;

determining a plurality of user preferences associated with the user based on the analyzing of the at least one interaction data;

provisioning a plurality of content corresponding to the plurality of experiential environments based on the plurality of user preferences;

determining at least one imagery adjustment for a framework of perception of the plurality of experiential environments based on the determining of the plurality of user preferences; and wherein the provision of the plurality of content corresponding to the plurality of experiential environments comprises modifying the plurality of content corresponding to the plurality of experiential environments based on the at least one imagery adjustment; and analyzing the at least one environmental sensor data, wherein the determining of the plurality of user preferences is further based on the analyzing of the at least one environmental sensor data; and analyzing the at least one condition, wherein the determining of the plurality of user preferences is further based on the analyzing of the at least one condition; and a storage device communicatively coupled with the processing device, wherein the storage device is configured for storing the at least one interaction data and the plurality of user preferences.

7. The system of claim 6, wherein the at least one interaction data comprises a plurality of direct indications of the plurality of user preferences of the user, wherein the analyzing of the at least one interaction data comprises identifying the plurality of direct indications of the plurality of user preferences, wherein the determining of the plurality of user preferences is further based on the identifying.

8. The system of claim 6, wherein the at least one interaction data comprises at least one historical interaction data, wherein the at least one historical interaction data comprises at least one historical interaction of the user in relation to the at least one experiential environment, wherein the analyzing of the at least one interaction data comprises analyzing the at least one historical interaction data, wherein the determining of the plurality of user preferences is further based on the analyzing of the at least one historical interaction data.

9. The system of claim 6, wherein the at least one user device comprises at least one interaction detecting sensor, wherein the at least one interaction detecting sensor is configured for generating the at least one interaction data based on capturing the at least one interaction of the user.

10. The system of claim 6, wherein the communication device is further configured for receiving at least one activity data of at least one activity of the user from at least one activity detector device, wherein the at least one activity detector device is configured for generating the at least one activity data based on detecting an activity of the user in relation to the at least one experiential environment, wherein the processing device is further configured for analyzing the at least one activity data, wherein the determining of the plurality of user preferences is further based on the analyzing of the at least one activity data.

* * * * *